United States Patent
Nasielski et al.

(10) Patent No.: US 8,942,690 B2
(45) Date of Patent: *Jan. 27, 2015

(54) ACCESS CONTROL BASED ON RECEIPT OF DEFINED INFORMATION FROM ACCESS TERMINAL

(75) Inventors: John Wallace Nasielski, San Diego, CA (US); Peerapol Tinnakornsrisuphap, San Diego, CA (US); Chandrasekhar Therazhandur Sundarraman, San Diego, CA (US); Jun Wang, La Jolla, CA (US); Masakazu Shirota, Tokyo (JP)

(73) Assignee: QUALCOMM Incorporated, San Diego, CA (US)

(*) Notice: Subject to any disclaimer, the term of this patent is extended or adjusted under 35 U.S.C. 154(b) by 624 days.

This patent is subject to a terminal disclaimer.

(21) Appl. No.: 12/881,959

(22) Filed: Sep. 14, 2010

(65) Prior Publication Data

US 2011/0223902 A1  Sep. 15, 2011

Related U.S. Application Data

(60) Provisional application No. 61/243,758, filed on Sep. 18, 2009.

(51) Int. Cl.
  *H04M 3/00* (2006.01)
  *H04W 48/02* (2009.01)
  *H04W 84/04* (2009.01)

(52) U.S. Cl.
  CPC ............ *H04W 48/02* (2013.01); *H04W 84/045* (2013.01)
  USPC ....... 455/418; 455/404.2; 455/41.2; 455/436; 455/41; 455/410; 455/432.1; 455/433; 455/432.3; 455/411

(58) Field of Classification Search
  CPC ....... H04W 8/22; H04W 4/001; H04W 24/02; H04W 4/046; H04W 84/045; H04W 48/02; H04W 12/08; H04M 1/72569; H04M 1/72572; Y02B 60/50; H04L 63/101
  USPC ............ 455/404.2, 41.2, 435.1, 436, 41, 410, 455/432.1, 433, 432.3, 422.1, 411; 370/331, 338, 216, 230, 329, 328, 342

See application file for complete search history.

(56) References Cited

U.S. PATENT DOCUMENTS 6,233,452 B1 * 5/2001 Nishino ..................... 455/435.2
6,404,388 B1 * 6/2002 Sollenberger et al. ........ 342/387

(Continued)

FOREIGN PATENT DOCUMENTS

WO   WO-2008157117 A1   12/2008
WO   WO2009029409      3/2009

(Continued)

OTHER PUBLICATIONS

"3rd Generation Partnership Project; Technical Specification Group Radio Access Network; UTRAN architecture for 3G Home Node B (HNB); Stage 2 (Release 8)", 3GPP Standard; 3GPP TS 25.467, 3rd Generation Partnership Project (3GPP), Mobile Competence Centre ; 650, Route des Lucioles ; F-06921 Sophia-Antipolis Cedex ; France, No. V8.2.0, Jun. 1, 2009, pp. 1-26, XP050369093.

(Continued)

*Primary Examiner* — Joseph Arevalo
(74) *Attorney, Agent, or Firm* — Fariba Yadegar-Bandari

(57) ABSTRACT

Access control techniques enable an access terminal to obtain service through an access point. In some aspects, access control techniques may be used to enable a user (e.g., an owner) of an access point to control whether an access terminal obtains service through the access point. For example, a user may temporarily disable access control at an access point to enable access points that register with the access point while access control is disabled to thereafter be allowed to obtain service through the access point. As another example, a shared secret may be provided to an access terminal whereby, upon presenting the shared secret to an access point, the access terminal is allowed to obtain service through the access point.

33 Claims, 15 Drawing Sheets

(56) References Cited

U.S. PATENT DOCUMENTS

| | | | | |
|---|---|---|---|---|
| 6,721,395 | B2* | 4/2004 | Martinez | 379/45 |
| 7,389,534 | B1 | 6/2008 | He | |
| 8,346,216 | B2* | 1/2013 | Osborn | 455/411 |
| 8,406,387 | B2* | 3/2013 | Jejina | 379/88.13 |
| 8,699,544 | B2* | 4/2014 | Chang | 375/145 |
| 2002/0135516 | A1* | 9/2002 | Sollenberger et al. | 342/387 |
| 2002/0198659 | A1* | 12/2002 | Doyle et al. | 701/300 |
| 2003/0063616 | A1* | 4/2003 | Lee | 370/401 |
| 2004/0063444 | A1* | 4/2004 | Tissot et al. | 455/466 |
| 2007/0168428 | A1* | 7/2007 | Clift et al. | 709/206 |
| 2007/0220252 | A1 | 9/2007 | Sinko | |
| 2008/0076412 | A1* | 3/2008 | Khetawat et al. | 455/432.1 |
| 2008/0090547 | A1 | 4/2008 | Struhsaker | |
| 2008/0288423 | A1 | 11/2008 | Eastman | |
| 2009/0070694 | A1 | 3/2009 | Ore et al. | |
| 2009/0092111 | A1 | 4/2009 | Horn et al. | |
| 2009/0156213 | A1 | 6/2009 | Spinelli et al. | |
| 2009/0168755 | A1 | 7/2009 | Peng et al. | |
| 2009/0191845 | A1 | 7/2009 | Morgan et al. | |
| 2009/0257416 | A1* | 10/2009 | Walker et al. | 370/338 |
| 2009/0262684 | A1 | 10/2009 | Khetawat et al. | |
| 2009/0285166 | A1* | 11/2009 | Huber et al. | 370/329 |
| 2009/0288139 | A1 | 11/2009 | Huber et al. | |
| 2011/0103230 | A1 | 5/2011 | Iyer | |
| 2011/0223886 | A1 | 9/2011 | Nasielski et al. | |
| 2011/0223912 | A1 | 9/2011 | Nasielski et al. | |

FOREIGN PATENT DOCUMENTS

| | | |
|---|---|---|
| WO | WO2009045335 A2 | 4/2009 |
| WO | WO2009048887 | 4/2009 |
| WO | WO2009068561 A2 | 6/2009 |

OTHER PUBLICATIONS

International Search Report and Written Opinion—PCT/US2010/049386, International Search Authority—European Patent Office—Dec. 6, 2010.

International Search Report and Written Opinion—PCT/US2010/049393—ISA/EPO—May 25, 2011.

International Search Report and Written Opinion—PCT/US2010/049397—ISA/EPO—Apr. 5, 2011.

Kineto Wireless Inc et al: "Managing allowed UE list for access control in the HNB-GW", 3GPP Draft; R3-082897, 3rd Generation Partnership Project (3GPP), Mobile Competence Centre ; 650, Route des Lucioles ; F-06921 Sophia-Antipolis Cedex ; France, No. Vienna, Austria; 20081017, Oct. 17, 2008, XP050324738, [retrieved on Oct. 17, 2008].

Nec, et al., "HNB Access Mode and Emergency Call indication to HNB-GW", 3GPP Draft; R3-083551, 3rd Generation Partnership Project (3GPP), Mobile Competence Centre ; 650, Route des Lucioles ; F-06921 Sophia-Antipolis Cedex ; France, No. Prague, Czech Republic; 20081117, Nov. 17, 2008, XP050324738, [retrieved on Nov. 17, 2008].

Partial International Search Report—PCT/US2010/049393—International Search Authority, European Patent Office, Dec. 13, 2010.

QUALCOMM Europe: "Support of an expiry time in the Allowed CSG list for temporary membership", 3GPP Draft; C1-090362, 3rd Generation, Partnership Project (3GPP), Mobile Competence Centre ; 650, Route des Lucioles ; F-06921 Sophia-Antipolis Cedex ; France, No. San Antionio; 20030224, Feb. 24, 2009, XP050310822, [retrieved on Feb. 24, 2009].

Taiwan Search Report—TW099131677—TIPO—Dec. 5, 2013.

* cited by examiner

ACCESS CONTROL BASED ON RECEIPT OF DEFINED INFORMATION FROM ACCESS TERMINAL

CLAIM OF PRIORITY

This application claims the benefit of and priority to commonly owned U.S. Provisional Patent Application No. 61/243,758, filed Sep. 18, 2009, the disclosure of which is hereby incorporated by reference herein.

CROSS-REFERENCE TO RELATED APPLICATION

This application is related to concurrently filed and commonly owned U.S. patent application Ser. No. 12/881,936, entitled "ACCESS CONTROL BASED ON RECEIPT OF DEFINED INFORMATION FROM ACCESS TERMINAL," and U.S. patent application Ser. No. 12/881,984, entitled "ACCESS POINT-BASED CONTROL OF ACCESS CONTROL LIST," the disclosure of each of which is hereby incorporated by reference herein.

BACKGROUND

1. Field

This application relates generally to wireless communication and more specifically, but not exclusively, to access control for an access point.

2. Introduction

A wireless communication network may be deployed over a defined geographical area to provide various types of services (e.g., voice, data, multimedia services, etc.) to users within that geographical area. In a typical implementation, access points (e.g., corresponding to different cells) are distributed throughout a network to provide wireless connectivity for access terminals (e.g., cell phones) that are operating within the geographical area served by the network.

As the demand for high-rate and multimedia data services rapidly grows, there lies a challenge to implement efficient and robust communication systems with enhanced performance. To supplement conventional network access points (e.g., macro access points), small-coverage access points may be deployed (e.g., installed in a user's home) to provide more robust indoor wireless coverage or other coverage for access terminals. Such small-coverage access points may be referred to as, for example, femto access points, femto cells, home NodeBs, home eNodeBs, or access point base stations. For convenience, small-coverage access points may be referred to as femto cells or femto access points in the discussion that follows.

Typically, a femto cell is connected to the Internet and the mobile operator's network via a DSL router or a cable modem. Hence, a femto cell uses an Internet connection and electricity supplied by the owner of the femto cell. In addition, in cases where a femto cell is connected to an owner's private network (e.g., a local area network), the femto cell may enable access terminals to access to that private network. In view of the above, a femto cell owner may wish to restrict which users (e.g., which access terminals) are allowed to access services through the femto cell.

In some implementations, access to a femto cell is controlled by means of an access control list. For example, a femto cell may be configured to only allow access terminals that are listed in the access control list for the femto cell to access a service through the femto cell.

Current techniques for adding an access terminal to an access control list tend to be somewhat complicated to implement and/or cumbersome for a femto cell owner to perform. For example, when a femto cell owner wishes to allow a subscriber (e.g., an access terminal owned by a subscriber) to access the femto cell, the femto cell owner may provide the phone number (e.g., a mobile directory number (MDN) or a mobile subscriber ISDN (MSISDN) number) of the subscriber to the network operator. This number may be provided, for example, via an interface provided by the operator (e.g., a web interface, a touch-tone dialing interface, or a customer service interface). The operator then maps the phone number to an identifier that the network uses to authenticate the access terminal. Such an identifier may take the form of, for example, International Mobile Subscriber Identity (IMSI), Mobile Station Identifier (MSID), or Network Access Identifier (NAI), depending on the network technology. Once the corresponding identifier is determined, the network updates the access control list for the femto cell and pushes the updated access control list to the access control enforcement point for the femto cell. Thus, this technique involves a relatively complicated database lookup on the network side, and requires several steps to be performed by the femto cell owner. Moreover, the updated access control list may not take effect immediately since some delay may be incurred when the network pushes the updated access control list to the enforcement point. Thus, there is a need for more efficient techniques for enabling access terminals to obtain service from access points such as femto cells.

SUMMARY

A summary of several sample aspects of the disclosure follows. This summary is provided for the convenience of the reader and does not wholly define the breadth of the disclosure. For convenience, the term some aspects may be used herein to refer to a single aspect or multiple aspects of the disclosure.

The disclosure relates in some aspects to techniques for enabling an access terminal to obtain service through an access point. Through the use of such techniques, a user of an access point may enable an access terminal to obtain service through the access point. For example, an owner of a femto cell may use these techniques to provision an access control list for the femto cell.

In some aspects, a user temporarily places an access point in a mode that allows unauthorized access terminals to connect to the access point. For example, access control at the access point may be temporarily disabled, such that any access points that register with the access point while access control is disabled are thereafter allowed to obtain service through the access point. In some implementations, the access control is disabled at an access point for a defined period of time. During this period of time, a user forces an access terminal to send a registration message to the access point. Upon receiving a registration message from an access terminal when access control is disabled, an enforcement point for the access point allows that access terminal to obtain service through the access point (e.g., by adding that access terminal to a local access control list). Thus, the user may use this procedure to enable specified access terminals to obtain service through the access point.

In some aspects, a shared secret is provided to an access terminal whereby, upon presenting the shared secret to an access point, the access terminal is allowed to obtain service through the access point. For example, a defined dial code may be maintained at an access point or at an enforcement point for the access point, and also provided to selected access terminals. Here, upon reception of a call at the access point, where the call uses the defined dial code from an access terminal that is not currently allowed to obtain service through the access point, an enforcement point for the access point allows the access terminal to obtain service through the access point. As another example, a defined indication is maintained at an access point or an enforcement point for the access point, and also provided to selected access terminals. In this case, upon reception of a message at the access point, where the message includes the defined indication from an access terminal, an enforcement point for the access point adds an identifier of the access terminal to an access control list for the access point. The access terminal is thus allowed to obtain service through the access point.

In some aspects, an access point requests its access point gateway to add an access terminal identifier to the access point's access control list. For example, a defined dial code (or indication) may be maintained at the access point and also provided to selected access terminals. Upon reception of a call using the defined dial code (or upon reception of a message including the defined indication) from an access terminal, the access point sends a message to its access point gateway. Here, the message sent by the access point indicates that an identifier of the access terminal is to be added to the access point's access control list. Upon reception of this message, the access point gateway adds the access terminal identifier to the access control list.

BRIEF DESCRIPTION OF THE DRAWINGS

These and other sample aspects of the disclosure will be described in the detailed description and the appended claims that follow, and in the accompanying drawings, wherein:

Figure 1:
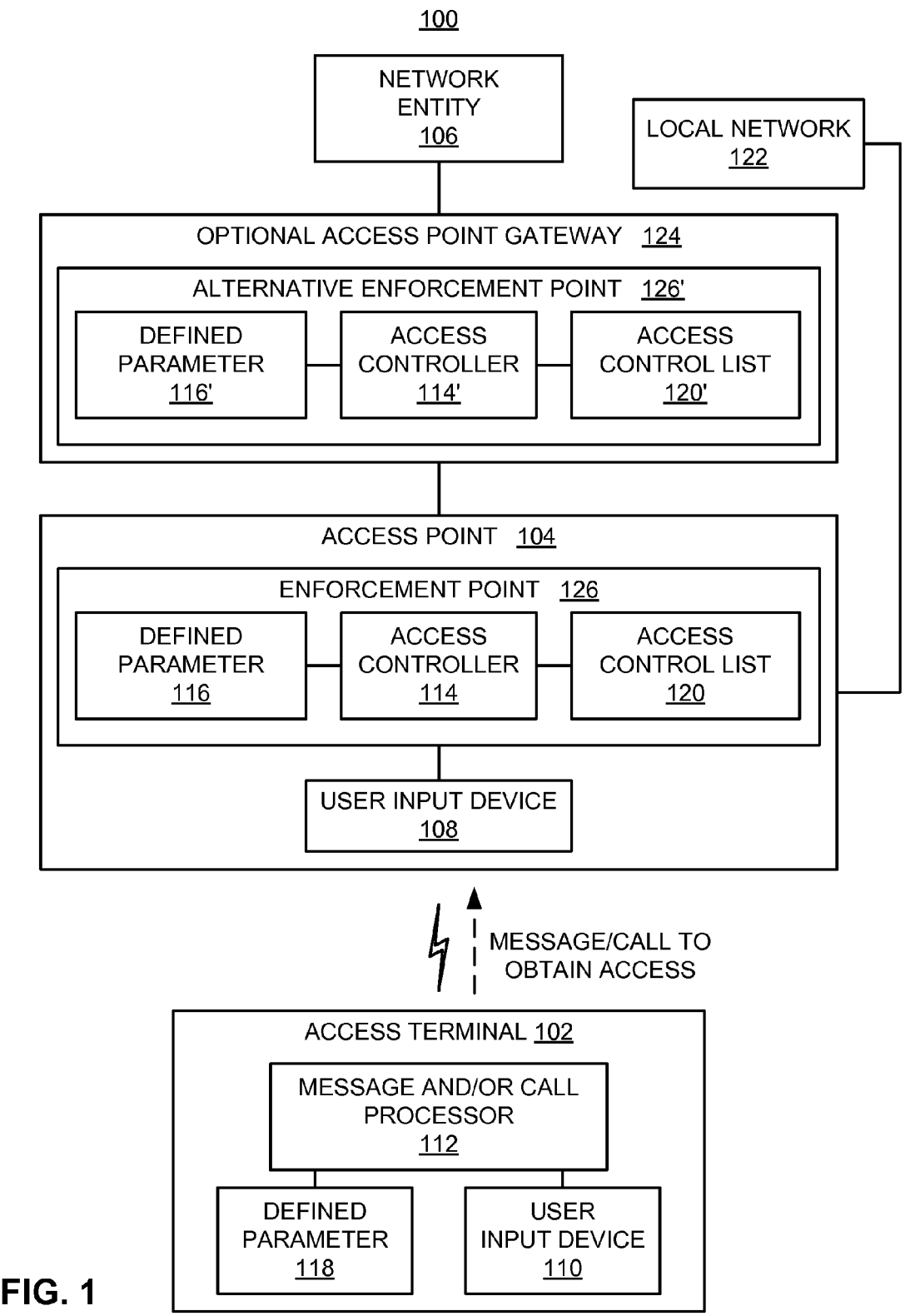
FIG. 1 is a simplified block diagram illustrating several aspects of a sample communication system adapted to provide access control as taught herein.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a portion of a communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, NodeBs, eNodeBs, femto cells, Home NodeBs, Home eNodeBs, and so on, while access terminals may be referred to or implemented as user equipment (UEs), mobile stations, and so on.

Access points in the system 100 provide access to one or more services (e.g., network connectivity) for one or more wireless terminals (e.g., access terminal 102) that may be installed within or that may roam throughout a coverage area of the system 100. For example, at various points in time the access terminal 102 may connect to an access point 104 or some access point in the system 100 (not shown). Each of these access points may communicate with one or more network entities (represented, for convenience, by the network entity 106) to facilitate wide area network connectivity.

These network entities may take various forms such as, for example, one or more radio and/or core network entities. Thus, in various implementations the network entity may represent functionality such as at least one of: network management (e.g., via an operation, administration, management, and provisioning entity), call control, session management, mobility management, gateway functions, interworking functions, or some other suitable network functionality. Also, two of more of these network entities may be co-located and/or two of more of these network entities may be distributed throughout the network.

In some implementations, certain types of access points (e.g., femto cells/Home NodeBs) may communicate with core network entities via an access point gateway (e.g., a Home NodeB gateway). In FIG. 1, such a gateway is represented by the optional access point gateway 124.

In accordance with the teachings herein, a user (e.g., an owner) of the access point 104 (e.g., a femto cell) may enable certain access terminals to access service through the access point 104. For example, access may be temporarily enabled if the access terminal 102 accesses the access point 104 in a specified way and/or under specified conditions. These access control operations may be performed by an enforcement point 126 associated with the access point 104. As discussed herein, such an enforcement point may be implemented at the access point or elsewhere (e.g., an alternative enforcement point 126' implemented at an access point gateway 124).

In some implementations, a temporary access control mode is invoked at the access point 104 whereby any access terminals that communicate with (e.g., register at) the access point 104 while that mode is invoked are allowed to access a designated service (or services) via the access point 104. As a specific example, a user of the access point 104 may actuate a user input device 108 (whereby an appropriate indication is provided to the enforcement point for the access point 104) to temporarily disable access control for the access point 104. While this access control is disabled, an access terminal that is not currently allowed to access (e.g., register with) the access point 104 is temporarily allowed to do so by the enforcement point. The user may then cause such an access terminal to access (e.g., register with) the access point 104 when access control is disabled. For example, the user may power-cycle the access terminal 102 or actuate a user input device 110 of the access terminal 102 to cause the access terminal 102 (e.g., a message and/or call processor 112) to initiate a registration procedure with the access point 104. In response to this access (while access control is disabled), the enforcement point for the access point 104 (e.g., an access controller 114 or 114') allows the access terminal 102 to obtain service through the access point 104.

In other implementations, an access terminal is allowed to access service through the access point 104 if the access terminal presents a "secret" parameter to the access point 104. Here, a defined parameter 116 or 116' (e.g., a dial code or some other defined parameter) is maintained at the access point 104 or the access point gateway 124. For example, a user may use the user input device 108 to store a parameter in the access point 104 (or the access point gateway 124), or the access point 104 (or the access point gateway 124) may generate a parameter internally and present it to the user. The value of this parameter is then provided to one or more access terminals designated by the user. Thus, a copy of the defined parameter 118 may be maintained at the access terminal 102. Then, when the access terminal 102 subsequently wishes to access a service via the access point 104, the access terminal 102 (e.g., the message and/or call processor 112) presents the parameter 118 to the access point 104. For example, the access terminal 102 may make a call to the access point 104 using a defined call code. Alternatively, the access terminal 102 may send a message including a defined parameter to the access point 104. Upon determining (e.g., at the access point 104 or the access point gateway 124) that the access terminal 102 provided the correct parameter, the enforcement point for the access point 104 (e.g., the access controller 114 or 114') allows the access terminal 102 to obtain service through the access point 104.

Access may be allowed in various ways. In a typical case, the enforcement point for the access point 104 adds an identifier of the access terminal being enabled for access to an access control list 120 or 120' for the access point 104. In this case, when any access terminal attempts to gain access via the access point 104, the access controller 114 or 114' checks to see whether the access terminal is listed in the access control list 120 or 120'. If it is listed, access is allowed. If not, access is denied.

Various types of services may be access via the access point 104. For example, the enforcement point for the access point 104 may allow the access terminal 102 to acquire network connectivity (e.g., connect to a wireless operator's network to make and receive calls and/or access the Internet). As another example, the enforcement point for the access point 104 may allow the access terminal 102 to access a local network 122 to which the access point 104 is connected (e.g., access a local area network in a home or office).

Sample operations that may be employed to provide access control in accordance with the teachings herein will now be described in more detail in conjunction with the flowcharts of FIGS. 2-5. For convenience, the operations of FIGS. 2-5 (or any other operations discussed or taught herein) may be described as being performed by specific components (e.g., the components of FIGS. 1 and 6). It should be appreciated, however, that these operations may be performed by other types of components and may be performed using a different number of components. It also should be appreciated that one or more of the operations described herein may not be employed in a given implementation.

Figure 2:
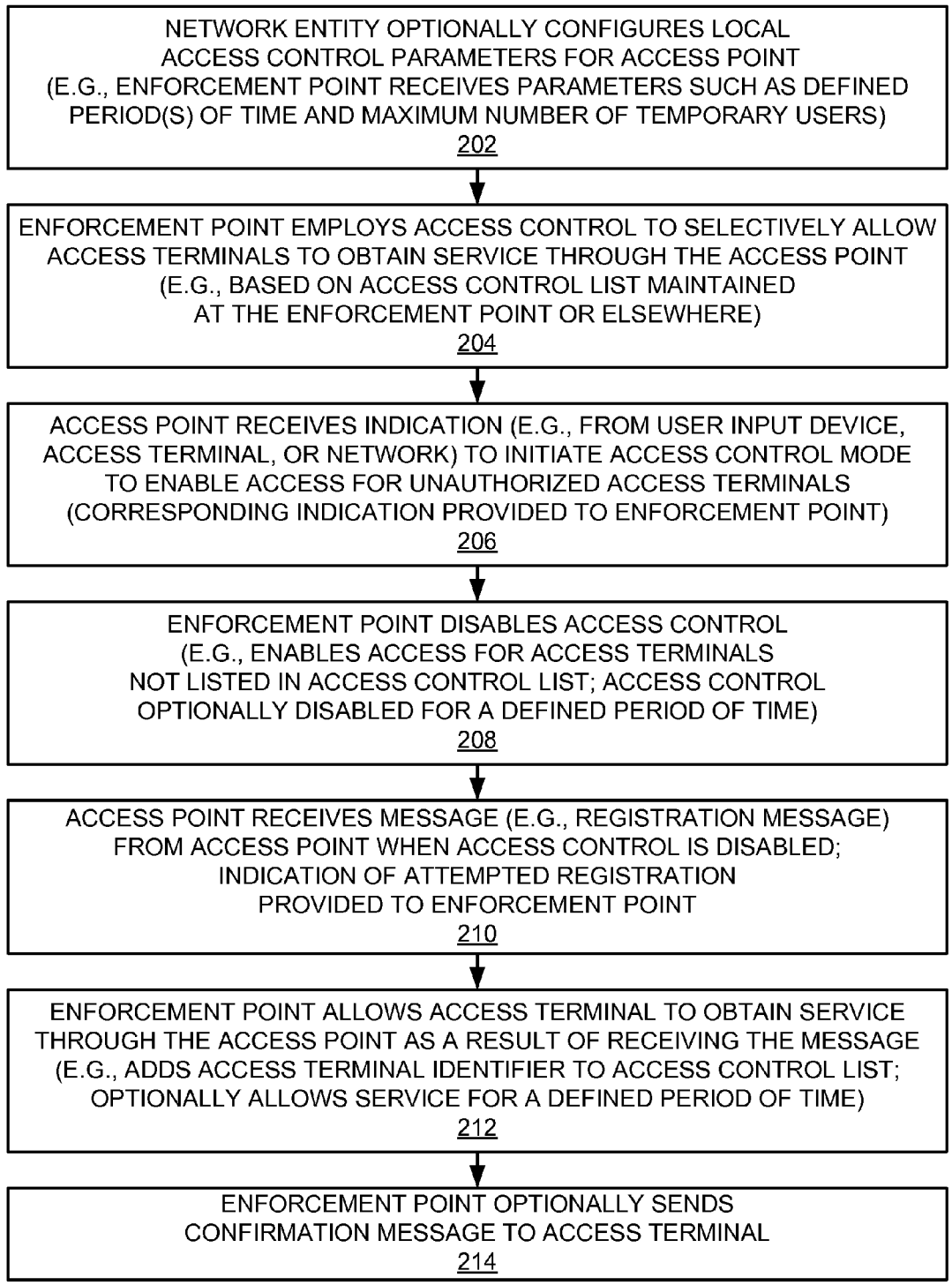
FIG. 2 is a flowchart of several sample aspects of operations that may be performed in conjunction with temporarily disabling access control to enable an access terminal to obtain service through an access point as taught herein.

FIG. 2 describes sample operations that may be performed in an implementation where the enforcement point for an access point temporarily disables access control, whereby an access terminal that registers with the access point when access control is disabled is thereafter allowed to obtain service through the access point. As described below, this access control procedure may be implemented in a variety of ways. In a typical scenario, a user of a femto cell disables access control at the femto cell for a period of time. The user then causes an access terminal to discover the femto cell and register with the femto cell during this period of time. As a result of this registration, the enforcement point for the femto cell adds the access terminal to the access control list for the femto cell. The access terminal is thereby allowed to access service through the femto cell.

Referring now to the operations of FIG. 2, a network operator generally maintains some level of control over how access control is implemented in the network. For example, even for cases where some aspects of access control are performed at the access points in the network, the operator may control how the enforcement points for the access points perform this access control. Accordingly, as represented by block 202, a network entity (e.g., a femto management server) may configure the enforcement point for an access point with one or more access control-related parameters.

As one example, the operator may specify that the enforcement point for an access point (e.g., a femto cell) may grant temporary access for up to a maximum period of time. Accordingly, in such a case, a network entity may send an indication of a defined period of time to the enforcement point for the access point (e.g., during a configuration procedure or at some other time). Here, the defined period of time may indicate the maximum length of time that an access terminal is allowed to obtain temporary service through the access point.

As another example, the operator may specify that an access point (e.g., a femto cell) may grant temporary access for up to a maximum number of users (or access terminals). Accordingly, in such a case, a network entity may send an indication of a maximum number of temporary users to the enforcement point for the access point.

As represented by block 204, during normal operation, the enforcement point for the access point employs access control to selectively allow certain access terminals to obtain service through the access point. For example, an access control list may be defined for each access point in the network, whereby an access control list for a given access point specifies which access terminals are currently allowed to obtain service (e.g., network service and/or local service) through the access point. Here, the list may include an identifier (e.g., IMSI, MSID, or NAI) for each allowed access terminal that uniquely identifies that access terminal in the network.

Access control lists may be managed in different ways in different implementations. Typically, an access control list for a given access point is maintained at an enforcement point for the access point. An enforcement point (and, hence, an access control list) may be located at various locations including, for example, the access point, a network entity such as femto management server, a femto cell gateway, a Home NodeB gateway, a mobility management entity, or some other entity.

In some implementations, an access control list for a given access point may be maintained at the enforcement point for the access point (e.g., a local enforcement point) and at another entity in the network (e.g., a network enforcement point). For example, the enforcement point for the access point may provide a first level of access control for network access while a network entity may provide ultimate access control for the network access. In this way, some of the access control enforcement may be offloaded from the network to the enforcement point for the access point. Also, in such a scheme, the enforcement point for the access point may provide ultimate access control for a local network connected to the access point (e.g., a local area network in a user's home or office).

The use of such a scheme may be particularly advantageous for small-coverage access points such as femto cells. Here, a user of a femto cell may only wish to allow certain designated access terminals to access service through the femto cell (e.g., to restrict the use of the user's Internet connectivity). In this case, the enforcement point for the femto cell may provide a local enforcement point that rejects any access terminals except for those listed in a local access control list. In this way, the network is relieved of handling access control for these rejected access terminals. Since there may be a large number (e.g., hundreds or thousands) of femto cells in a system, this may result in significant offloading of access control processing from the network.

At some point in time, a user of an access point may decide to allow a specific access terminal to obtain service through the access point. For example, the user may wish to temporarily allow one or more visitors to gain access to an operator's network or the user's local network via the access point.

In accordance with the teachings herein, the user may initiate a temporary access control mode at the enforcement point for the access point to enable access by access terminals that are not currently allowed to obtain service through the access point (e.g., access terminals that are not currently on the access control list for the access point). This temporary access control mode may be initiated in various ways.

In some implementations, a user activates a user input device of the access point (or some other entity where the enforcement point is implemented) to provide an indication to initiate the temporary access control mode. For example, the user may depress a switch on the access point, use a keypad on the access point, use a touch screen on the access point, and so on, to provide the indication.

In some implementations, an access terminal (e.g., an access terminal that is already in the access control list) is used to send an indication to initiate the temporary access control mode. For example, a user may use a user input device of the access terminal to cause the indication to be sent. Such an indication may comprise, for example, a defined call code (e.g., *123) that the user dials for this purpose or some other defined parameter that the access terminal sends via a message to the enforcement point for the access point (e.g., in response to the user invoking a corresponding application on the access terminal).

In some implementations, the user uses a network connection to the enforcement point for the access point to send an indication to initiate the temporary access control mode. For example, the user may access a web page or use an application running on a computer to cause the indication to be sent via a network (e.g., the Internet or a local area network) to the enforcement point for the access point.

Accordingly, as represented by block 206, at some point in time, the access point will receive an indication to initiate the temporary access control mode to thereby enable access by currently unauthorized access terminals. As discussed above, this indication may be received in various ways (e.g., via a user input device of the access point, from an access terminal, via a network interface of the access point). A corresponding indication is thus provided to the enforcement point. For example, in a case where the enforcement point is at an access point gateway, the access point sends a corresponding indication to the access point gateway (e.g., in a message sent via an Iu-H interface for the case of a Home NodeB gateway).

The temporary access control mode may be implemented in various ways. In some implementations, the temporary access control mode is activated for a defined period of time. For example, the temporary access control mode may be activated for two minutes after the user presses an activation button on the access point. In some implementations, the temporary access control mode is deactivated upon the occurrence of a specified event. For example, the temporary access control mode may be deactivated upon reception of a registration message from an access terminal or reception of an indication from the user (e.g. via a user input device, etc.) indicating that the temporary access control mode is to be terminated. In some implementations, the access point may provide an indication to inform the user that the temporary access control mode is activated. For example, the access point may provide a visual indication (e.g., a light is illuminated), an audible indication, or some other suitable indication.

Under normal operating conditions (e.g., when the access control of block 204 is employed), an unauthorized access terminal that attempts to access (e.g., register with) the access point may be rejected or ignored. Thus, to enable access by such an unauthorized access terminal, the temporary access control mode initiated at block 206 involves temporarily disabling normal access control for the access point.

Accordingly, as represented by block 208, the enforcement point for the access point disables access control as a result of receiving the indication of block 206. For example, this may involve temporarily enabling access for access terminals that are not listed in the access control list for the access point. Also, in implementations where the temporary access control mode is invoked for a defined period of time as discussed above, the access control is deactivated for the defined period of time.

As represented by block 210, the access point may receive a message (e.g., a registration message) from an access terminal when the temporary access control mode is activated (e.g., when normal access control is disabled). For example, the user (or someone else) may cause an access terminal (or multiple access terminals) to discover the access point and perform registration with the access point when the temporary access control mode is activated. Thus, the access point receives a message that indicates that an access terminal is attempting to register with the access point. The message received by the access point may include an access terminal identifier (e.g., IMSI, MSID, or NAI) that the access point subsequently uses for access control. A corresponding indication is thus provided to the enforcement point. For example, in a case where the enforcement point is at the access point, the receipt of the registration message (or other suitable message) provides an indication that an access terminal is attempting to register with the access point. In a case where the enforcement point is at an access point gateway, the access point sends a message to the access point gateway (e.g., by forwarding the registration message or sending some other message), whereby that message indicates that an access terminal is attempting to register with the access point.

Various techniques may be employed to cause an access terminal to communicate (e.g., register) with the access point. For example, a user may power-cycle (i.e., turn-off and then turn-on) the access terminal. As another example, the user may use a keypad or touch screen of the access terminal to invoke an application to initiate this procedure. As yet another example, the user may activate some other type of user input device (e.g., a physical switch) of the access terminal to initiate this procedure.

As represented by block 212, the enforcement point for the access point allows the access terminal to obtain service through the access point as a result of receiving the message of block 210. For example, upon receiving an identifier (e.g., IMSI) of the access terminal in a registration message, the enforcement point for the access point may simply send this information to the wireless operator network without performing local access control (e.g., without checking to see if the access terminal is on the access control list). Assuming this access terminal is allowed on the wireless operator network (e.g., authentication and registration were completed successfully), the network informs the enforcement point for the access point of this via an appropriate message (e.g., a session initiation protocol (SIP) message). Also, the network may translate the access terminal identifier (e.g., IMSI) to the phone number (e.g., MDN or MSISDN) of the access terminal and provide this information to the enforcement point for the access point (e.g., via the SIP message).

Depending on the access control policies of the access point owner and/or the network operator, the enforcement point for the access point may update an access control list at the appropriate access control list storage point (e.g., at the enforcement point). For example, if an access control policy specifies that the access terminal is to be given only limited access, the enforcement point for the access point may not add the access terminal to the access control list. Here, limited access may involve, for example, allowing access only for a defined period of time or applying alternative billing for home user access terminals versus visitor user access terminals (e.g., home users may have "free" unlimited calling while visitors may be subjected to other billing arrangements). In such a case, the access point may maintain some other record (e.g., a temporary record) that indicates that the access terminal is to be allowed access for the defined period of time. Also, in some implementations, the enforcement point for the access point may simply send the access terminal identifier to the network, whereupon the network decides whether to add the access terminal to the access control list.

In the event the access control policy specifies that the access control list is to be updated, the enforcement point for the access point may add appropriate access terminal identifiers to the list. For example, a network identifier (e.g., IMSI, MSID, or NAI) and a phone number (e.g., MDN or MSISDN) of the access terminal may be added to the access control list. Also, in cases where there are multiple versions (e.g., network and local versions) of the access control list, the enforcement point for the access point may only update one access control list (e.g., a local copy maintained at the access point). Hence, the other access control list (e.g., a network copy) may not be updated or may be updated only by action of the network.

As discussed above, in some cases access is only allowed on a temporary basis (e.g., as configured by the operator). In such cases, the enforcement point for the access point may only allow the access terminal to access the service for up to a defined (maximum) period of time.

As represented by block 214, in some implementations, the enforcement point for the access point sends a confirmation message to the access terminal to inform the access terminal that the access terminal is now allowed to obtain service through the access point (e.g., that the access terminal was added to the access control list). For example, the enforcement point for the access point may trigger the making of a call to the access terminal whereby, upon answering the call, the user of the access terminal is informed by a voice prompt that access is allowed. Alternatively, the enforcement point for the access point may trigger the sending of a text-based message or provide some other suitable indication that a particular access terminal has been granted access. In this way, the user of the access point may ensure that the desired access terminal (and not some other unauthorized access terminal in the vicinity) has been granted access.

As mentioned above, a user of an access point may employ the access control scheme of FIG. 2 to provision multiple access terminals at the access point. For example, the user may cause multiple access terminals to register with the access point when the temporary access control mode is activated. In addition, the user may invoke the temporary access control mode multiple times to enable multiple access terminals to obtain service through the access point.

Figure 3:
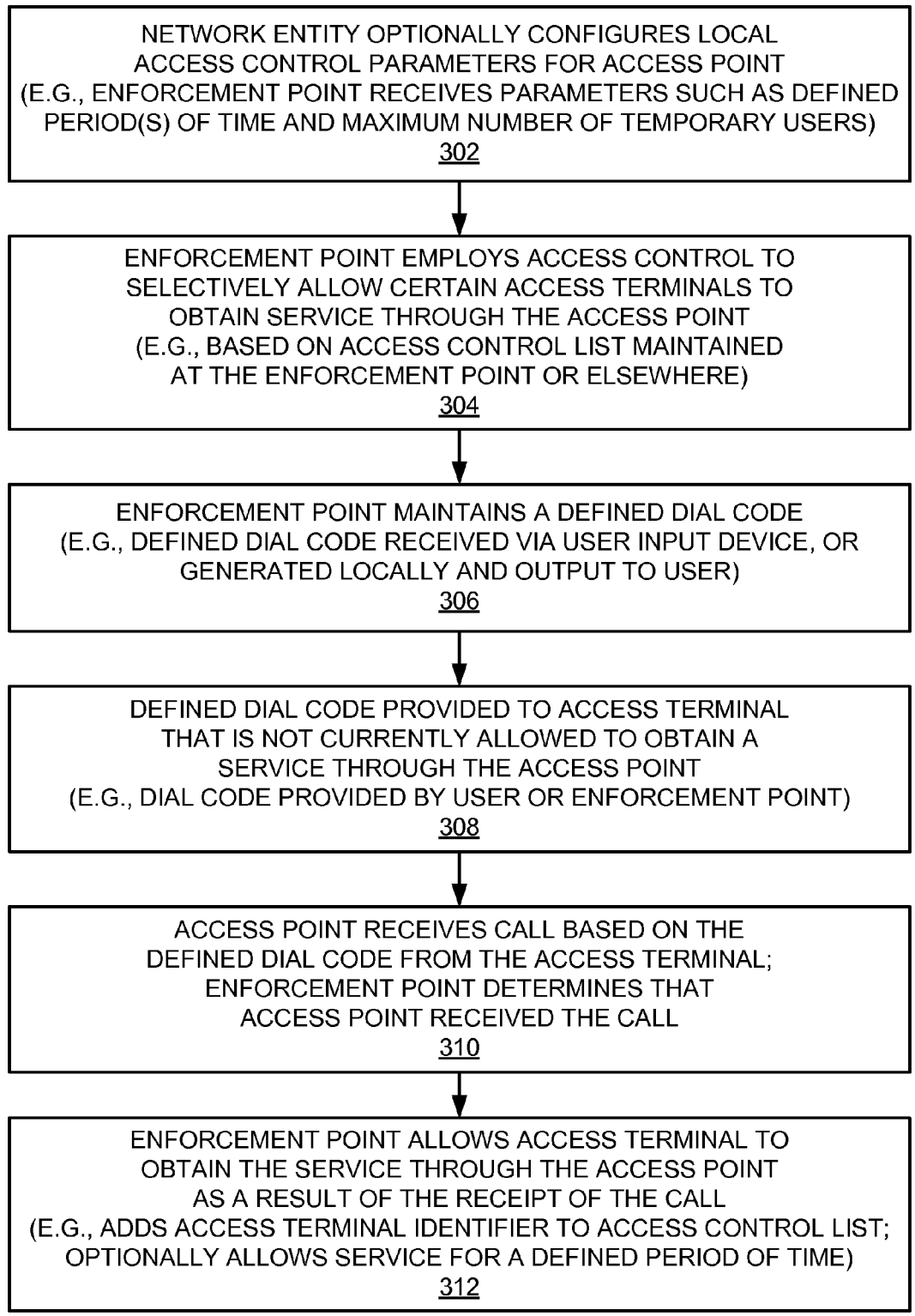
FIG. 3 is a flowchart of several sample aspects of operations that may be performed in conjunction with using a defined dial code to enable an access terminal to obtain service through an access point as taught herein.

FIG. 3 describes sample operations that may be performed in an implementation where an access terminal is allowed to access service through an access point if the access terminal uses a specific call code to call the access point. As described below, this access control procedure may be implemented in a variety of ways. In a typical scenario, a specific call code is stored in the enforcement point for a femto cell. The owner of the femto cell may then share this call code with one or more access terminal users. When one of these users wishes to access a service through the femto cell, the user uses the call code to call the femto cell. Upon receipt of a call based on this call code at the femto cell, the enforcement point for the femto cell adds the corresponding access terminal to the access control list for the femto cell. The access terminal is thereby allowed to access service through the femto cell.

Referring now to the operations of FIG. 3, the enforcement point for an access point may employ access control during normal operations in a similar manner as described above at FIG. 2. For example, as represented by block 302, a network entity may configure local access control parameters for an access point in a similar manner as described at block 202. For example, a network entity (e.g., a femto management server) may specify the maximum number of locally-managed temporary users (e.g., access terminals) and the time window (e.g., maximum access time) allowed for these locally-managed temporary users. Also, as represented by block 304, the enforcement point for the access point may employ access control during normal operations in a similar manner as described at block 204. Thus, the enforcement point for the access point may perform access control based on, for example, an access control list maintained at the enforcement point for the access point or elsewhere.

As represented by block 306, in this case, the enforcement point for the access point maintains a defined dial code that is used for access control. Such a dial code may take the form of, for example, *2323 or some other suitable dialing combination. In general, to restrict the users that are able to access the access point using this dial code, the user of the access point will keep this dial code secret and only share it with selected users. In some cases, multiple dial codes may be maintained at the enforcement point for the access point. For example, different dial codes may be allocated for different access terminals. Also, different dial codes may be used to grant access to different services. In addition, some dial codes may be used for temporary access (e.g., access allowed only for a defined period of time), while other dial codes may be used for permanent access.

The enforcement point for the access point may include a storage component (e.g., including a memory device) for maintaining the defined dial code. In conjunction with maintaining the defined dial code, the enforcement point for the access point may acquire the defined dial code in various ways.

In some implementations, the enforcement point for the access point receives a dial code via a user input device that is actuated by a user. For example, the user may use a keypad or touch screen on the access point to store the dial code at the enforcement point for the access point.

In some implementations, the enforcement point for the access point generates the dial code locally and outputs the dial code. For example, the enforcement point for the access point may randomly generate a dial code and output the dial code to the user or a designated entity. In a typical case, the access point outputs the dial code via a user output device (e.g., in the form of a visual display, an audible indication, a message, and so on). In some implementations, the access point (or the enforcement point) outputs the dial code via a message to another entity (e.g., an access terminal or network entity). For example, the dial code may be output via a network connection or some other connection so that it may be displayed when a user accesses a management page for the access point.

In some implementations, another entity is used to program the dial code into the enforcement point for the access point. For example, the access point may be pre-configured with the dial code at the time of manufacture. Alternatively, or in addition, the dial code may be programmed into the access point (or access point gateway) at some later point in time. For example, a network entity (e.g., a femto management server) may send a dial code to the enforcement point for the access point via a network connection (e.g., at the time of deployment or some later point in time).

At some point in time, a user of an access point may decide to allow a specific access terminal to obtain a service through the access point. For example, a user who is visiting the owner of an access terminal may have an access terminal that is not currently allowed to obtain a particular service (e.g., network connectivity) through the access point (e.g., the access terminal is not listed in the access control list for the access point). However, the owner of the access point may wish to temporarily allow the user to obtain that service through the access point.

As represented by block 308, to enable such access, the defined dial code is provided to the access terminal. The defined dial code may be provided to the access terminal in various ways. Typically, a user simply enters the dial code into the access terminal via a user input device. For example, the user may use a keypad or touch screen on the access terminal to enter the dial code and place a call to the access point. In some cases, the dial code may be stored in the access terminal so that the dial code may be automatically sent by the access terminal when the access terminal is instructed to call the access point. In these cases, the dial code may be entered by a user, or uploaded from the access point or some other entity (e.g., a network entity) to the access terminal (e.g., via a message).

As represented by block 310, the access point will therefore receive a call based on the defined dial code from the access terminal. The enforcement point may thereby determine that the access point received a call that is based on the defined dial code from an access terminal that is not currently allowed to obtain a service through the access point. For example, in a case where the enforcement point is at the access point, this determination may be made upon receipt of the call. As another example, in a case where the enforcement point is at an access point gateway, the access point sends an indication to the access point gateway (e.g., by forwarding the call or sending some other message), whereby the indication indicates that the access point has received the call.

To enable such a call, the access terminal is allowed some form of preliminary (e.g., restricted) association with the access point so that the call from the access terminal is not rejected or ignored by the access point. For example, provisions may be made to enable the access terminal to register with the access point before or while placing the call.

In some implementations, an access terminal that is not listed in the access control list for a given access point may still be allowed to perform limited signaling (e.g., registration) with that access point. For example, an access terminal may be allowed to register with the access terminal through the use of signaling association (e.g., as specified by 3GPP2). Here, the access terminal is allowed to register at the access point so that the access terminal is, for example, able to be paged by the network via the access point. Such an access terminal would not, however, be allowed to place a call through the network via the access point until the access terminal is added to the access control list. Rather, the enforcement point for the access point would redirect such a call to the operator's macro network.

In some implementations, the enforcement point for an access point may support an operating mode that enables access terminals to have limited access at the access point under certain conditions. For example, in 3GPP Rel. 9, a Home eNodeB operating in hybrid access mode may grant limited access to non-home UEs if, for example, sufficient resources are available (e.g., the resources are not being used by home UEs).

Referring again to FIG. 3, as represented by block 312, the enforcement point for the access point allows the access terminal to obtain service through the access point as a result of the access point receiving the call of block 310. For example, depending on the access control policies of the access point owner and/or the network operator, the enforcement point for the access point may update an access control list at the appropriate access control list storage point (e.g., at the enforcement point) in a similar manner as discussed above. For example, if an access control policy specifies that the access terminal is to be given only limited access (e.g., temporary access or alternative billing access), the enforcement point for the access point may not add the access terminal to the access control list. Also, in cases where the access is temporary, the enforcement point for the access point may only allow access to the service for up to a defined period of time (e.g., as specified by the operator).

In the event the access control policy specifies that the access control list is to be updated, the enforcement point for the access point may add an identifier (e.g., IMSI, MSID, or NAI) and phone number (e.g., MDN or MSISDN) of the access terminal to the access control list. As discussed herein, the enforcement point for the access point may acquire the identifier via a registration message or other suitable message from the access terminal, and the enforcement point for the access point may acquire the phone number from the operator network.

As mentioned above, a user of an access point may employ the access control scheme of FIG. 3 to provision multiple access terminals at the access point. For example, one or more defined dial codes may be provided to several access terminal users. Each user may then call the access point to enable the user's access terminal to access a service through the access point.

Figure 4:
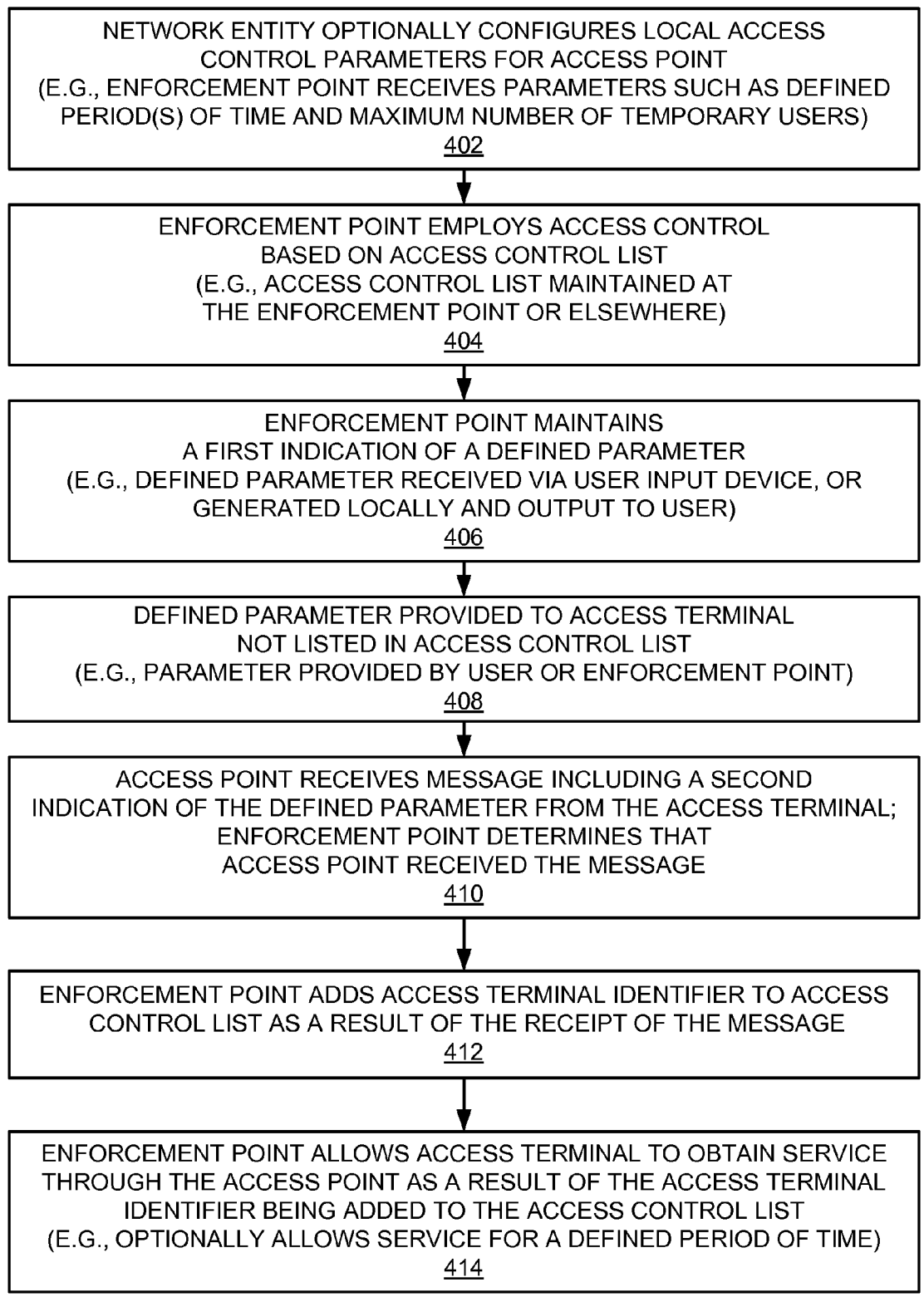
FIG. 4 is a flowchart of several sample aspects of operations that may be performed in conjunction with using a defined indication to enable an access terminal to obtain service through an access point as taught herein.

FIG. 4 describes sample operations that may be performed in an implementation where an access terminal is allowed to access service through an access point if the access terminal sends a message including a specific parameter (e.g., access code) to the access point. As described below, this access control procedure may be implemented in a variety of ways. In a typical scenario, a specified parameter is stored at the enforcement point for a femto cell and also provided to one or more access terminals. When a user of such an access terminal wishes to access a service through the femto cell, the user causes the access terminal to send a message including the parameter to the femto cell. Upon receipt of a message including this parameter at the femto cell, the enforcement point for the femto cell adds the access terminal to the access control list for the femto cell. The access terminal is thereby allowed to access service through the femto cell.

Referring now to the operations of FIG. 4, the enforcement point for an access point may employ access control during normal operations in a similar manner as described above at FIG. 2. For example, as represented by block 402, a network entity may configure local access control parameters for an access point as described at block 202. For example, a network entity (e.g., a femto management server) may specify the maximum number of locally-managed temporary users (e.g., access terminals) and the time window (e.g., maximum access time) allowed for these locally-managed temporary users. Also, as represented by block 404, the enforcement point for the access point may employ access control during normal operations as described at block 204. Thus, the enforcement point for the access point may perform access control based on, for example, an access control list maintained at the enforcement point for the access point or elsewhere.

As represented by block 406, the enforcement point for the access point maintains an indication of a defined parameter that is used for access control. In general, to restrict the users that are able to access the access point using this parameter, the user of the access point will keep this parameter secret and only share it with selected users. In some cases, multiple parameters may be maintained at the enforcement point for the access point. For example, different parameters may be allocated for different access terminals. Also, different parameters may be used to grant access to different services. In addition, some parameters may be used for temporary access (e.g., access allowed only for a defined period of time), while other parameters may be used for permanent access.

The enforcement point for the access point may include a storage component (e.g., including a memory device) for maintaining an indication of the parameter. In conjunction with maintaining the defined parameter, the enforcement point for the access point may acquire the defined parameter in various ways.

In some implementations, the enforcement point for the access point receives a parameter via a user input device that is actuated by a user. For example, the user may use a keypad or touch screen on the access point to store the parameter in the enforcement point for the access point.

In some implementations, the enforcement point for the access point generates the parameter locally and outputs the parameter. For example, the enforcement point for the access point may randomly generate a parameter and output the parameter to the user or a designated entity. In a typical case, the access point outputs the parameter via a user output device (e.g., in the form of a visual display, an audible indication, a message, and so on). In some implementations, the access point (or the enforcement point) outputs the parameter via a message to another entity (e.g., an access terminal or network entity). For example, the parameter may be output via a network connection or some other connection so that it may be displayed when a user accesses a management page for the access point.

In some implementations, another entity programs the parameter into the enforcement point for the access point. For example, the access point may be pre-configured with the parameter at the time of manufacture. Alternatively, or in addition, the parameter may be programmed into the access point (or the access point gateway) at some later point in time. For example, a network entity (e.g., a femto management server) may send a defined parameter to the enforcement point for the access point via a network connection (e.g., at the time of deployment or some later point in time).

At some point in time, a user of an access point may decide to allow a specific access terminal to obtain a service through the access point. Accordingly, as represented by block 408, the defined parameter is provided to the access terminal to enable this access. The defined parameter may be provided to the access terminal in various ways. In some cases, a user enters the parameter into the access terminal via a user input device. For example, the user may use a keypad or touch screen on the access terminal to enter the parameter and cause the access terminal to send a message including that parameter to the access point. In some cases, the parameter may be stored in the access terminal so that the parameter may be automatically sent by the access terminal when the access terminal is instructed to send a message the access point. In these cases, the parameter may be entered by a user, or uploaded from the access point or some other entity (e.g., a network entity) to the access terminal (e.g., via a message). As a specific example, the owner of an access point may send a text message including the parameter to the access terminal. The user of the access terminal may then invoke an application on the access terminal to cause the access terminal to send a message including the received parameter to the access point.

As represented by block 410, the access point will therefore receive a message that includes an indication of the defined parameter from the access terminal. The enforcement point may thereby determine that the access point received a message that includes this indication. For example, in a case where the enforcement point is at the access point, this determination may be made upon receipt of the message. In a case where the enforcement point is at an access point gateway, the access point sends a message to the access point gateway (e.g., by forwarding the received message or sending some other message), whereby the message indicates that the access point has received a message including the indication of the defined parameter.

To enable the reception of such a message, the access terminal may be allowed some form of preliminary (e.g., signaling) association with the access point so that a message from the access terminal is not rejected or ignored by the access point. For example, provisions may be made to enable the access terminal to register with the access point before or while placing the call (e.g., through the use of signaling association or hybrid access mode as discussed above).

As represented by block 412, depending on the access control policies of the access point owner and/or the network operator, the enforcement point for the access point may update an access control list at the appropriate access control list storage point (e.g., at the enforcement point) in a similar manner as discussed above. For example, if an access control policy specifies that the access terminal is to be given only limited access (e.g., temporary access or alternative billing access), the enforcement point for the access point may not add the access terminal to the access control list. Conversely, in the event the access control policy specifies that the access control list is to be updated, the enforcement point for the access point may add an identifier (e.g., IMSI, MSID, or NAI) and phone number (e.g., MDN or MSISDN) of the access terminal to the access control list. As discussed herein, the enforcement point for the access point may acquire the identifier via a registration message or other suitable message from the access terminal, and the enforcement point for the access point may acquire the phone number from the operator network.

As represented by block 414, the enforcement point for the access point allows the access terminal to obtain service through the access point as a result of the access terminal being added to the access control list at block 412. In cases where the access is temporary, the enforcement point for the access point may only allow access to the service for up to a defined period of time (e.g., as specified by the operator).

A user of an access point may employ the access control scheme of FIG. 4 to provision multiple access terminals at the access point. For example, one or more defined parameters may be provided to several access terminal users. Each of these access terminals may then send a message including a defined parameter to the access point to enable the access terminal to access a service through the access point.

Figure 5:
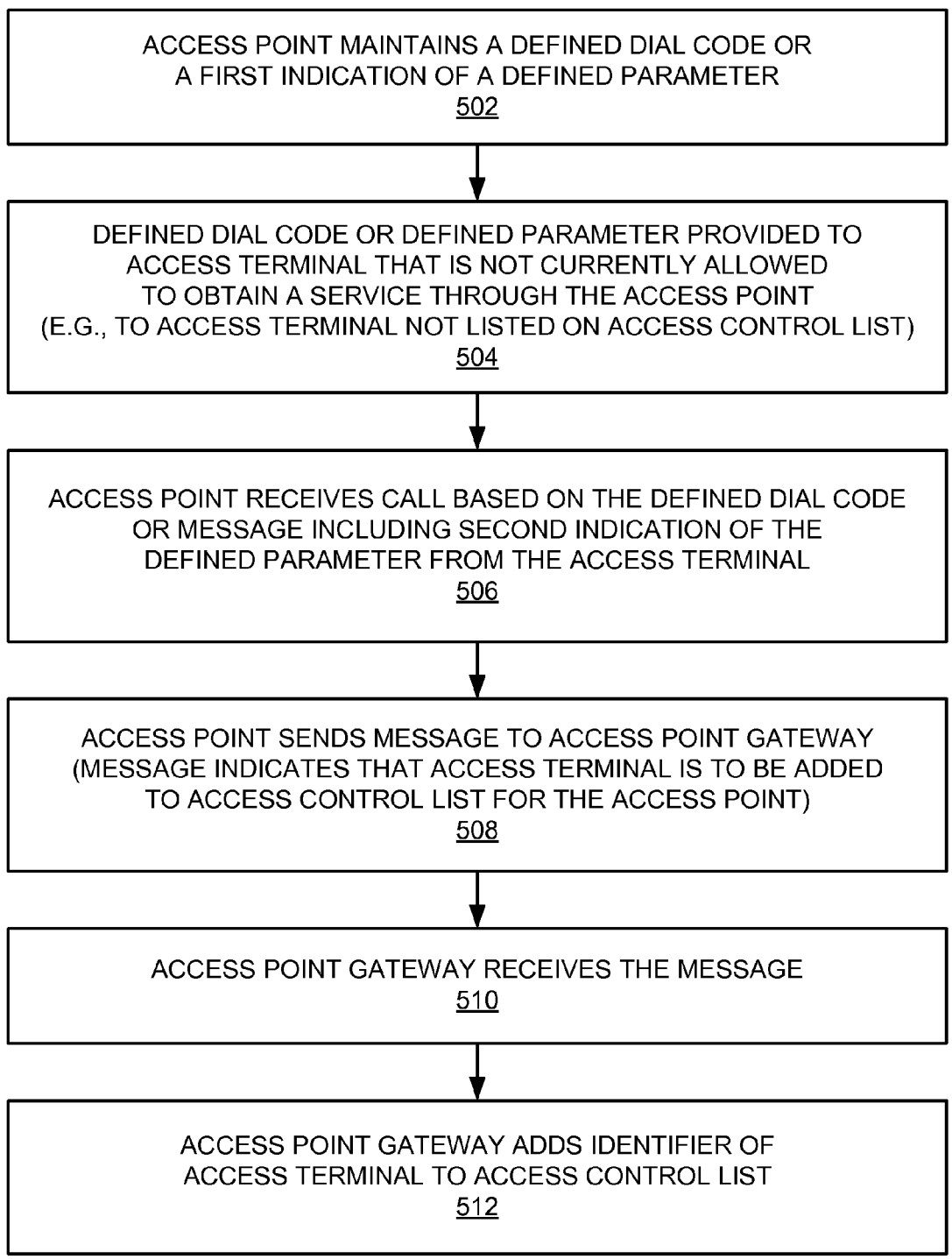
FIG. 5 is a flowchart of several sample aspects of operations that may be performed in conjunction with an access point sending a message to request updating of an access control list as taught herein.

Referring now to the operations of FIG. 5, in some implementations where the enforcement point for an access point is not at the access point, the access point may still verify whether it received a call associated with a defined dial code or received a message with a defined indication. In such a case, the access point may send a message to the enforcement point, whereby the message indicates that that access terminal that made the call or sent the message is to be added to the access control list of the access point.

As represented by block 502, the access point maintains a defined dial code or an indication of a defined parameter (e.g., as discussed above at block 306 or 406). As represented by block 504, the defined dial code or the defined parameter is provided to an access terminal (e.g., as discussed above at block 308 or 408). As represented by block 506, at some point in time the access point receives a call based on the defined dial code from the access terminal or receives a message including an indication of the defined parameter from the access terminal (e.g., as discussed above at block 310 or 410). As represented by block 508, the access point sends a message to the access point gateway for the access point, whereby the message indicates that the access terminal is to be added to an access control list for the access point. The access point gateway then receives this message as represented by block 510. As a result of receiving this message, the access point gateway adds an identifier of the access terminal to the access control list as represented by block 512. Accordingly, the access point gateway (which incorporates the enforcement point for the access point in this case) allows the access terminal to obtain service through the access point as discussed herein.

An access control scheme implemented in accordance with the teachings herein may provide several advantages over conventional access control techniques. For example, new users (e.g., user's access terminals) may be immediately allowed to access service (e.g., immediately added to an access control list) through an access point without operator involvement. Also, such a scheme may be simpler for a user to perform and easier for a user to understand. In addition, an additional level of privacy may be provided for a user (e.g., since the user may be the only one who knows who has been allowed to access the user's access point).

Figure 6:
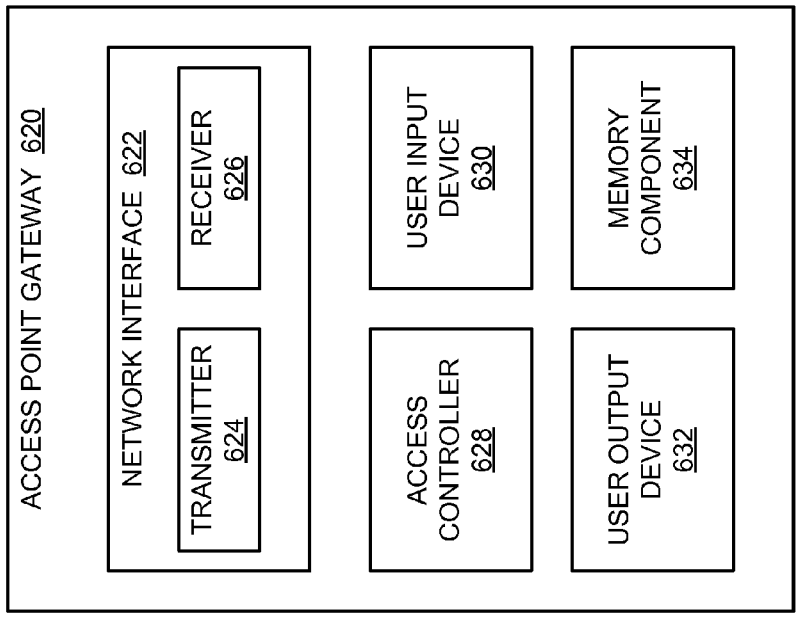
FIG. 6 is a simplified block diagram of several sample aspects of components that may be employed in communication nodes.
Figure 6:
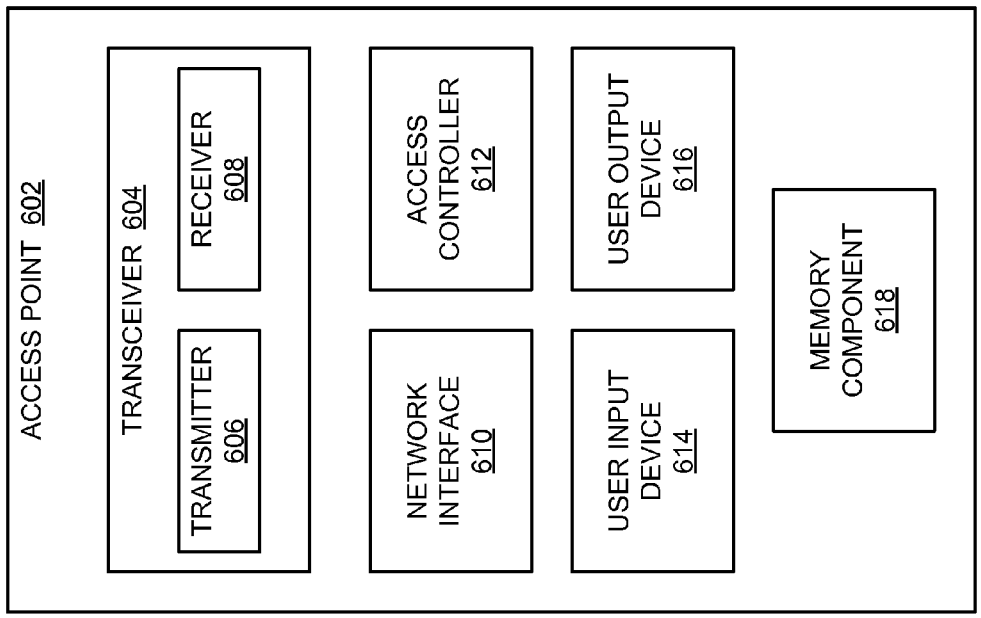

FIG. 6 illustrates several sample components that may be incorporated into nodes such as an access point 602 or an access point gateway 620 to perform access control operations as taught herein. In practice, the described components also may be incorporated into other nodes in a communication system. For example, other nodes in a system may include components similar to those described for the access point 602 to provide similar functionality. Also, a given node may contain one or more of the described components. For example, an access point may contain multiple transceiver components that enable the access point to operate on multiple frequencies and/or communicate via different technologies.

As shown in FIG. 6, the access point 602 includes a transceiver 604 for communicating with other nodes. The transceiver 604 includes a transmitter 606 for sending signals (e.g., messages) and a receiver 608 for receiving signals (e.g., messages, calls, indications). The access point 602 also includes a network interface 610 for communicating with other nodes (e.g., network entities). For example, the network interface 610 may be configured to communicate with one or more network entities via a wire-based or wireless backhaul. In some aspects, the network interface 610 may be implemented as a transceiver (e.g., including transmitter and receiver components) configured to support wire-based or wireless communication (e.g., receiving indications from a network entity via the backhaul, sending messages to an access point gateway). Similarly, the access point gateway 620 includes at least one network interface (represented by network interface 622) that includes transmitter and receiver components 624 and 626, respectively, configured to support wire-based or wireless communication (e.g., receiving messages from a network entity via the backhaul, receiving messages and indications from an access point).

The access point 602 and the access point gateway 620 include other components that may be used in conjunction with access control operations as taught herein. For example, the access point 602 and/or the access point gateway may include an access controller 612 or 628 for controlling access for the access point 602 (e.g., disabling access control, allowing an access terminal to obtain service through the access point, maintaining an access control list, receiving an indication or dial code or parameter via a user input device, maintaining a defined dial code, maintaining an indication of a defined parameter, adding an identifier of an access terminal to an access control list, determining that an access point received a call or a message) and for providing other related functionality as taught herein. In addition, the access point 602 and the access point gateway 620 may include a user input device 614 and 630, respectively, for receiving input from a user, a user output device 616 and 632, respectively, for providing an output (e.g., visual, audible, digital) to a user, or a memory component 618 and 634, respectively, (e.g., including a memory device) for maintaining information (e.g., defined dial codes, indications of defined parameters).

For convenience the access point 602 and the access point gateway 620 are shown in FIG. 6 as including components that may be used in the various examples described herein. In practice, one or more of the illustrated components may be implemented in a different manner in different implementations. For example, the functionality of the access controller 612 and the user input device 614 may be different in implementations corresponding to FIG. 2 versus implementations corresponding to FIG. 3.

The components of FIG. 6 may be implemented in one or more processors (e.g., each of which uses and/or incorporates data memory for storing information or code used by the processor to provide this functionality). For example, some of the functionality of block 604 and some or all of the functionality of blocks 610-618 may be implemented by a processor or processors of an access point and data memory of the access point (e.g., by execution of appropriate code and/or by appropriate configuration of processor components). Similarly, some of the functionality of block 622 and some or all of the functionality of blocks 628-634 may be implemented by a processor or processors of an access point gateway and data memory of the access point gateway (e.g., by execution of appropriate code and/or by appropriate configuration of processor components).

As discussed above, in some aspects the teachings herein may be employed in a network that includes macro scale coverage (e.g., a large area cellular network such as a 3G network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

A node (e.g., an access point) that provides coverage over a relatively large area may be referred to as a macro access point while a node that provides coverage over a relatively small area (e.g., a residence) may be referred to as a femto access point (femto cell). It should be appreciated that the teachings herein may be applicable to nodes associated with other types of coverage areas. For example, a pico access point may provide coverage (e.g., coverage within a commercial building) over an area that is smaller than a macro area and larger than a femto area. In various applications, other terminology may be used to reference a macro access point, a femto access point, or other access point-type nodes. For example, a macro access point may be configured or referred to as an access node, base station, access point, eNodeB, macro cell, and so on. Also, a femto access point may be configured or referred to as a Home NodeB, Home eNodeB, access point base station, femto cell, and so on. In some implementations, a node may be associated with (e.g., referred to as or divided into) one or more cells or sectors. A cell or sector associated with a macro access point, a femto access point, or a pico access point may be referred to as a macro cell, a femto cell, or a pico cell, respectively.

Figure 7:
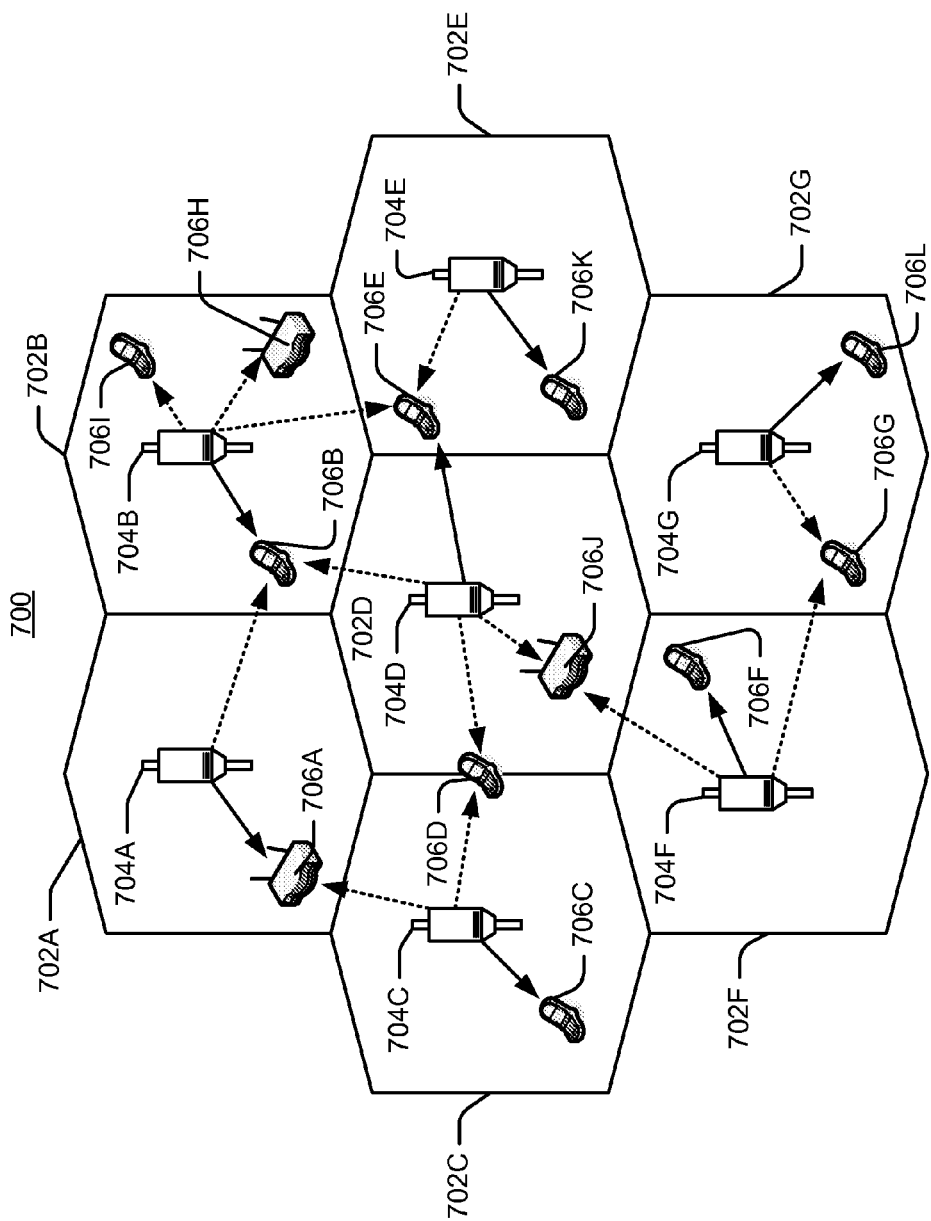
FIG. 7 is a simplified diagram of a wireless communication system.

FIG. 7 illustrates a wireless communication system 700, configured to support a number of users, in which the teachings herein may be implemented. The system 700 provides communication for multiple cells 702, such as, for example, macro cells 702A-702G, with each cell being serviced by a corresponding access point 704 (e.g., access points 704A-704G). As shown in FIG. 7, access terminals 706 (e.g., access terminals 706A-706L) may be dispersed at various locations throughout the system over time. Each access terminal 706 may communicate with one or more access points 704 on a forward link (FL) and/or a reverse link (RL) at a given moment, depending upon whether the access terminal 706 is active and whether it is in soft handoff, for example. The wireless communication system 700 may provide service over a large geographic region. For example, macro cells 702A-702G may cover a few blocks in a neighborhood or several miles in a rural environment.

Figure 8:
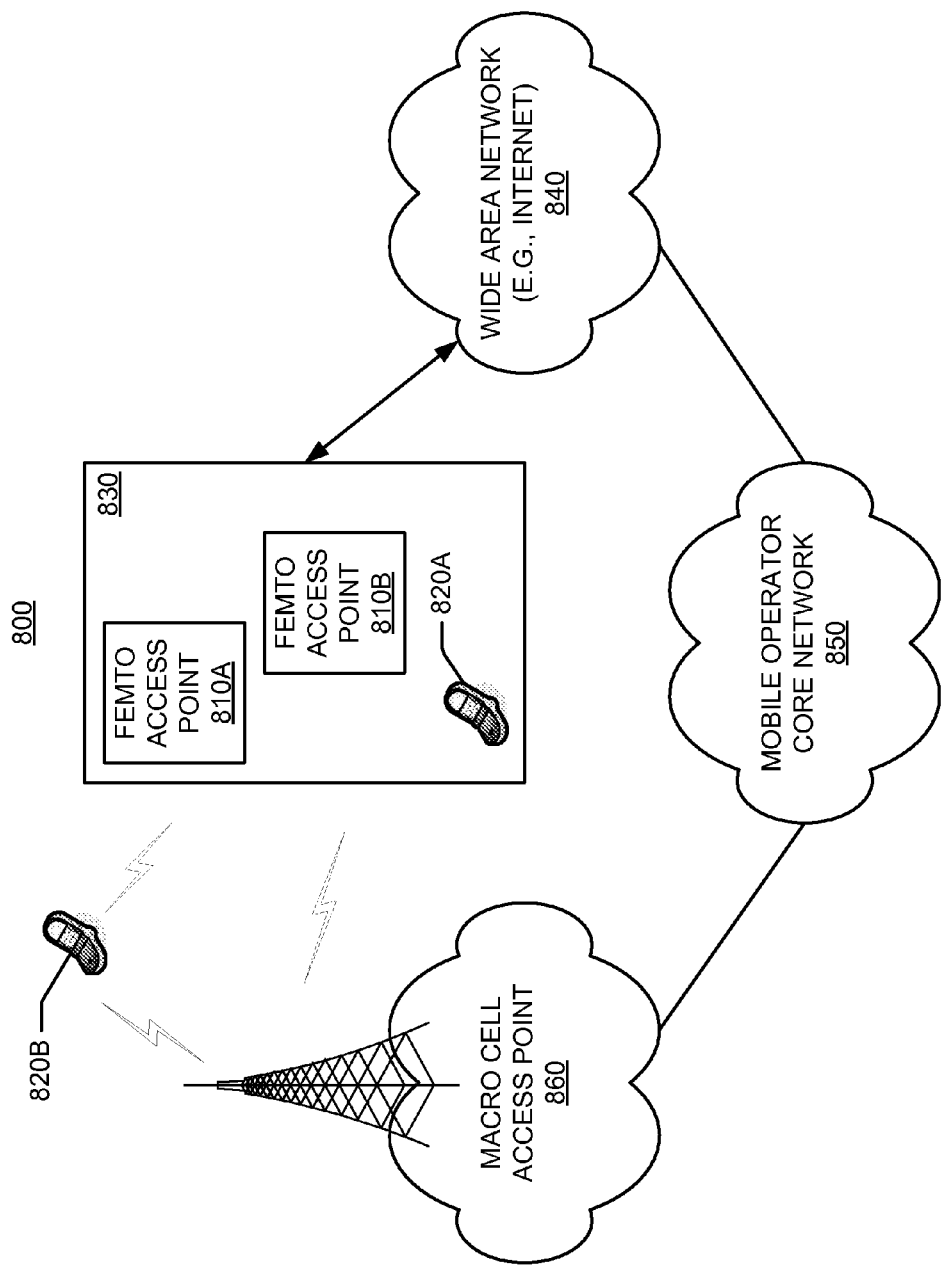
FIG. 8 is a simplified diagram of a wireless communication system including femto nodes.

FIG. 8 illustrates an exemplary communication system 800 where one or more femto access points are deployed within a network environment. Specifically, the system 800 includes multiple femto access points 810 (e.g., femto access points 810A and 810B) installed in a relatively small scale network environment (e.g., in one or more user residences 830). Each femto access point 810 may be coupled to a wide area network 840 (e.g., the Internet) and a mobile operator core network 850 via a DSL router, a cable modem, a wireless link, or other connectivity means (not shown). As will be discussed below, each femto access point 810 may be configured to serve associated access terminals 820 (e.g., access terminal 820A) and, optionally, other (e.g., hybrid or alien) access terminals 820 (e.g., access terminal 820B). In other words, access to femto access points 810 may be restricted whereby a given access terminal 820 may be served by a set of designated (e.g., home) femto access point(s) 810 but may not be served by any non-designated femto access points 810 (e.g., a neighbor's femto access point 810).

Figure 9:
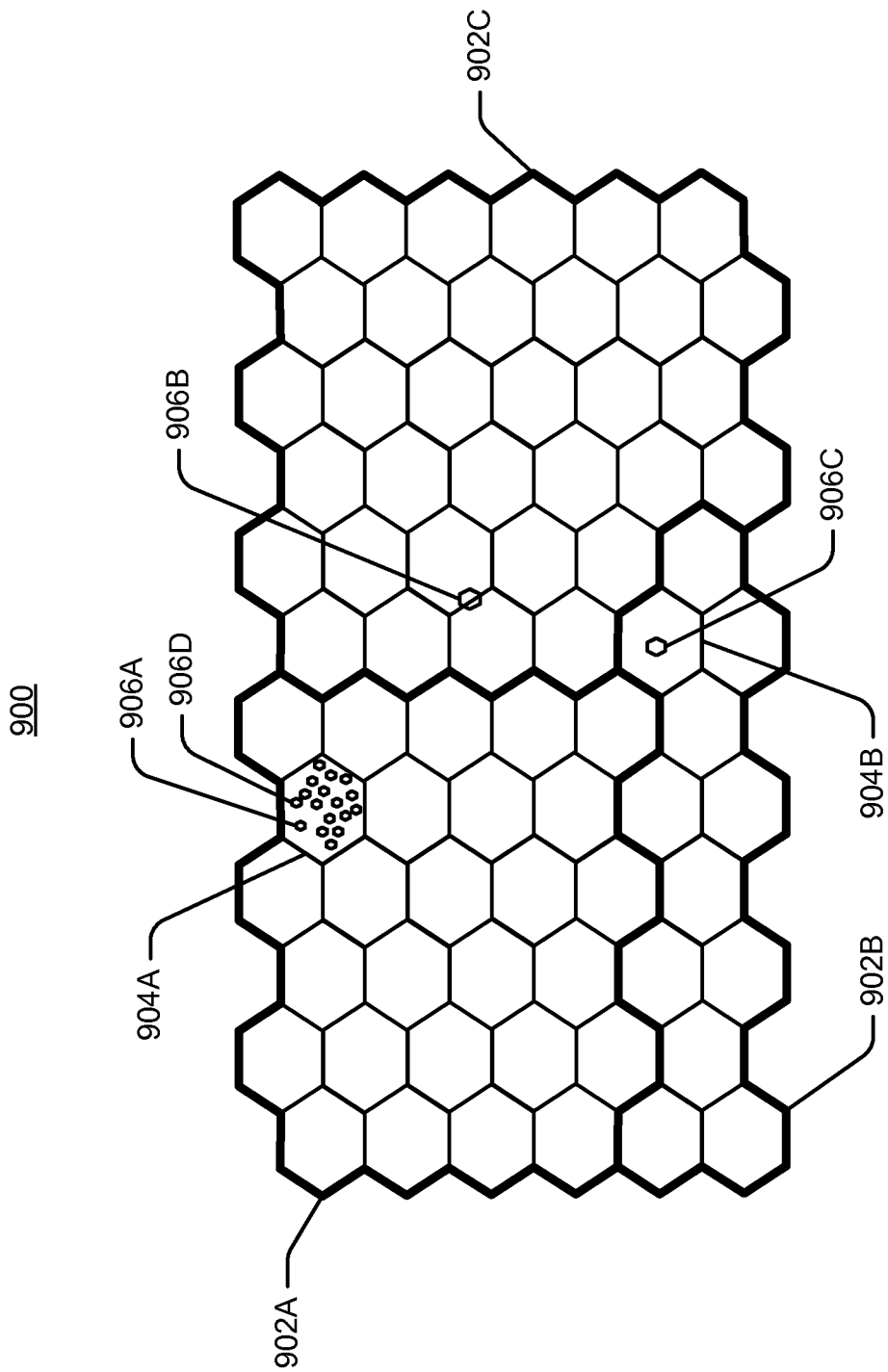
FIG. 9 is a simplified diagram illustrating coverage areas for wireless communication.

FIG. 9 illustrates an example of a coverage map 900 where several tracking areas 902 (or routing areas or location areas) are defined, each of which includes several macro coverage areas 904. Here, areas of coverage associated with tracking areas 902A, 902B, and 902C are delineated by the wide lines and the macro coverage areas 904 are represented by the larger hexagons. The tracking areas 902 also include femto coverage areas 906. In this example, each of the femto coverage areas 906 (e.g., femto coverage areas 906B and 906C) is depicted within one or more macro coverage areas 904 (e.g., macro coverage areas 904A and 904B). It should be appreciated, however, that some or all of a femto coverage area 906 may not lie within a macro coverage area 904. In practice, a large number of femto coverage areas 906 (e.g., femto coverage areas 906A and 906D) may be defined within a given tracking area 902 or macro coverage area 904. Also, one or more pico coverage areas (not shown) may be defined within a given tracking area 902 or macro coverage area 904.

Referring again to FIG. 8, the owner of a femto access point 810 may subscribe to mobile service, such as, for example, 3G mobile service, offered through the mobile operator core network 850. In addition, an access terminal 820 may be capable of operating both in macro environments and in smaller scale (e.g., residential) network environments. In other words, depending on the current location of the access terminal 820, the access terminal 820 may be served by a macro cell access point 860 associated with the mobile operator core network 850 or by any one of a set of femto access points 810 (e.g., the femto access points 810A and 810B that reside within a corresponding user residence 830). For example, when a subscriber is outside his home, he is served by a standard macro access point (e.g., access point 860) and when the subscriber is at home, he is served by a femto access point (e.g., access point 810A). Here, a femto access point 810 may be backward compatible with legacy access terminals 820.

A femto access point 810 may be deployed on a single frequency or, in the alternative, on multiple frequencies. Depending on the particular configuration, the single frequency or one or more of the multiple frequencies may overlap with one or more frequencies used by a macro access point (e.g., access point 860).

In some aspects, an access terminal 820 may be configured to connect to a preferred femto access point (e.g., the home femto access point of the access terminal 820) whenever such connectivity is possible. For example, whenever the access terminal 820A is within the user's residence 830, it may be desired that the access terminal 820A communicate only with the home femto access point 810A or 810B.

In some aspects, if the access terminal 820 operates within the macro cellular network 850 but is not residing on its most preferred network (e.g., as defined in a preferred roaming list), the access terminal 820 may continue to search for the most preferred network (e.g., the preferred femto access point 810) using a better system reselection (BSR) procedure, which may involve a periodic scanning of available systems to determine whether better systems are currently available and subsequently acquire such preferred systems. The access terminal 820 may limit the search for specific band and channel. For example, one or more femto channels may be defined whereby all femto access points (or all restricted femto access points) in a region operate on the femto channel(s). The search for the most preferred system may be repeated periodically. Upon discovery of a preferred femto access point 810, the access terminal 820 selects the femto access point 810 and registers on it for use when within its coverage area.

Access to a femto access point may be restricted in some aspects. For example, a given femto access point may only provide certain services to certain access terminals. In deployments with so-called restricted (or closed) access, a given access terminal may only be served by the macro cell mobile network and a defined set of femto access points (e.g., the femto access points 810 that reside within the corresponding user residence 830). In some implementations, an access point may be restricted to not provide, for at least one node (e.g., access terminal), at least one of: signaling, data access, registration, paging, or service.

In some aspects, a restricted femto access point (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., femto access points) that share a common access control list of access terminals.

Various relationships may thus exist between a given femto access point and a given access terminal. For example, from the perspective of an access terminal, an open femto access point may refer to a femto access point with unrestricted access (e.g., the femto access point allows access to any access terminal). A restricted femto access point may refer to a femto access point that is restricted in some manner (e.g., restricted for access and/or registration). A home femto access point may refer to a femto access point on which the access terminal is authorized to access and operate on (e.g., permanent access is provided for a defined set of one or more access terminals). A hybrid (or guest) femto access point may refer to a femto access point on which different access terminals are provided different levels of service (e.g., some access terminals may be allowed partial and/or temporary access while other access terminals may be allowed full access). An alien femto access point may refer to a femto access point on which the access terminal is not authorized to access or operate on, except for perhaps emergency situations (e.g., 911 calls).

From a restricted femto access point perspective, a home access terminal may refer to an access terminal that is authorized to access the restricted femto access point installed in the residence of that access terminal's owner (usually the home access terminal has permanent access to that femto access point). A guest access terminal may refer to an access terminal with temporary access to the restricted femto access point (e.g., limited based on deadline, time of use, bytes, connection count, or some other criterion or criteria). An alien access terminal may refer to an access terminal that does not have permission to access the restricted femto access point, except for perhaps emergency situations, for example, such as 911 calls (e.g., an access terminal that does not have the credentials or permission to register with the restricted femto access point).

For convenience, the disclosure herein describes different functionality in the context of a femto access point. It should be appreciated, however, that a pico access point may provide the same or similar functionality for a larger coverage area. For example, a pico access point may be restricted, a home pico access point may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 10:
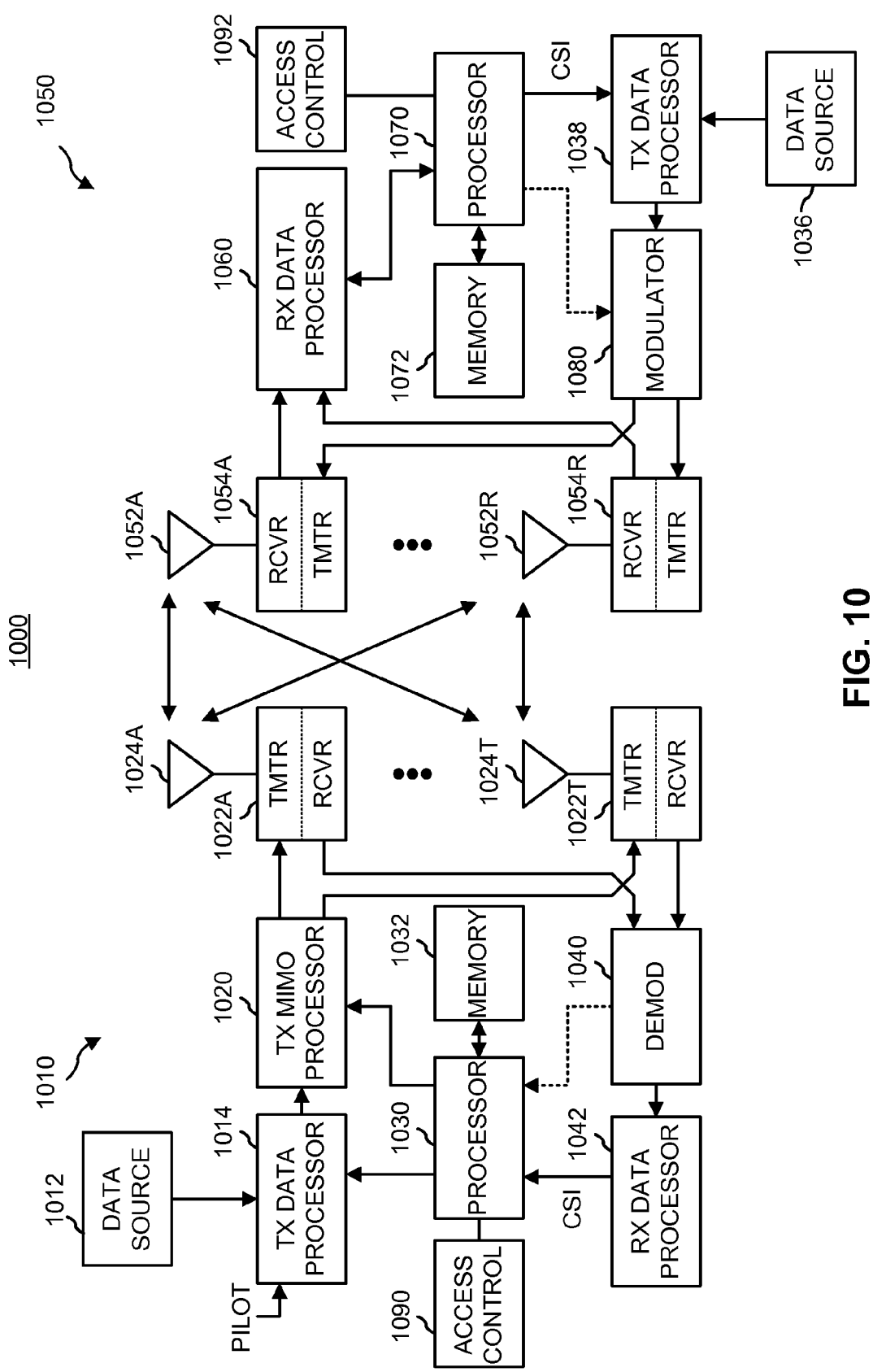
FIG. 10 is a simplified block diagram of several sample aspects of communication components.
Figure 11:
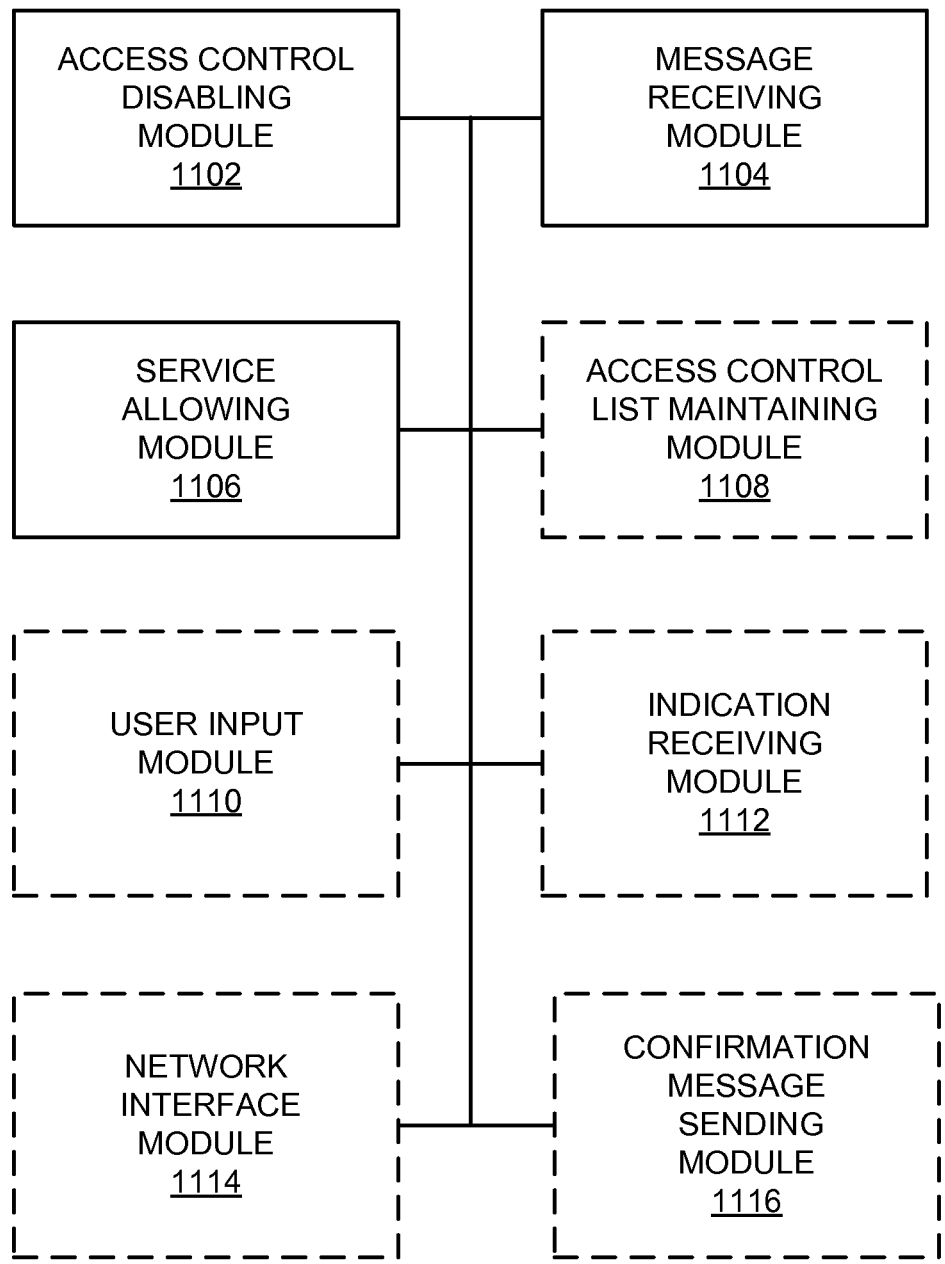
FIGS. 11-16 are simplified block diagrams of several sample aspects of apparatuses configured to provide access control as taught herein.
Figure 12:
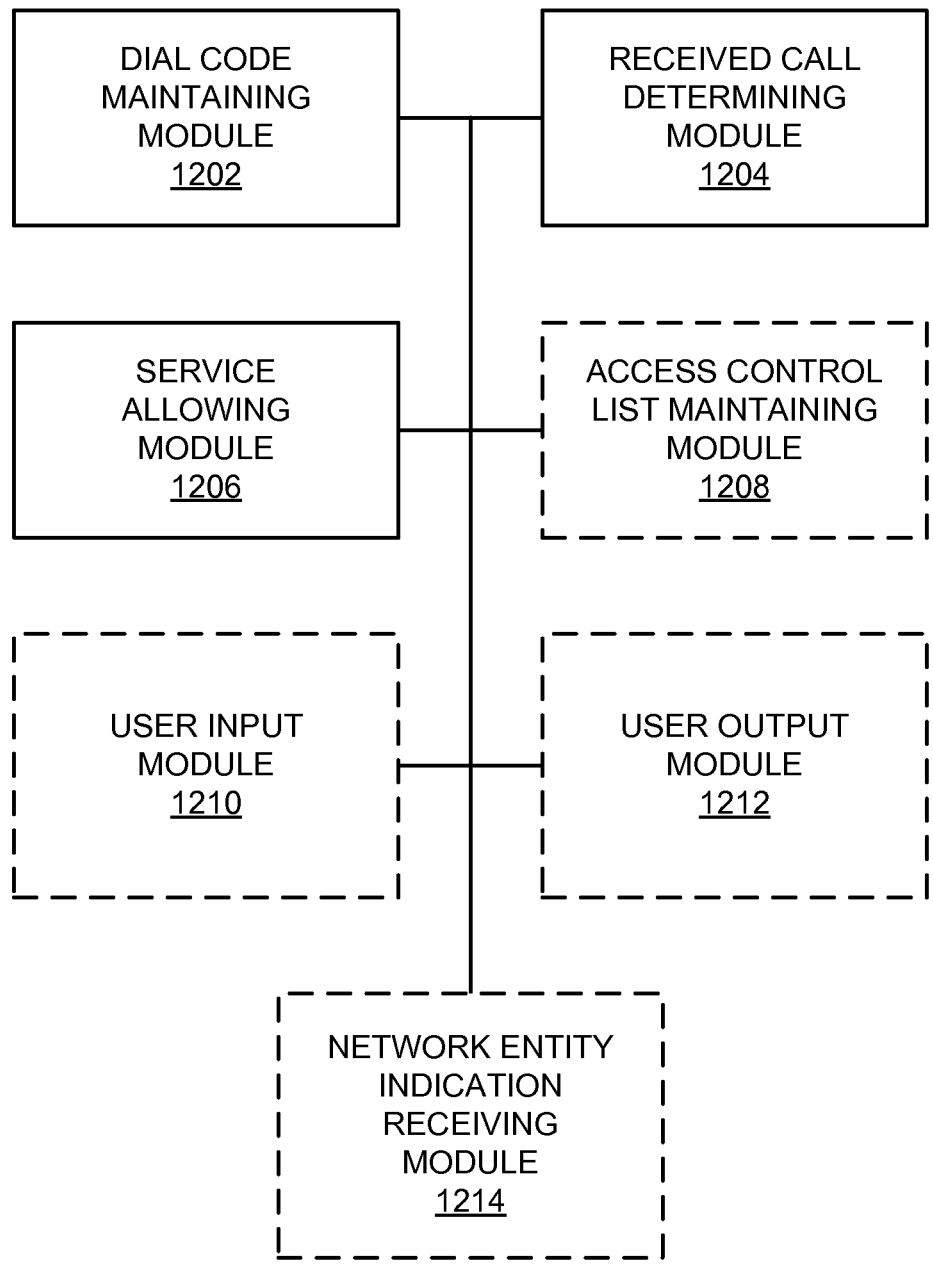
Figure 13:
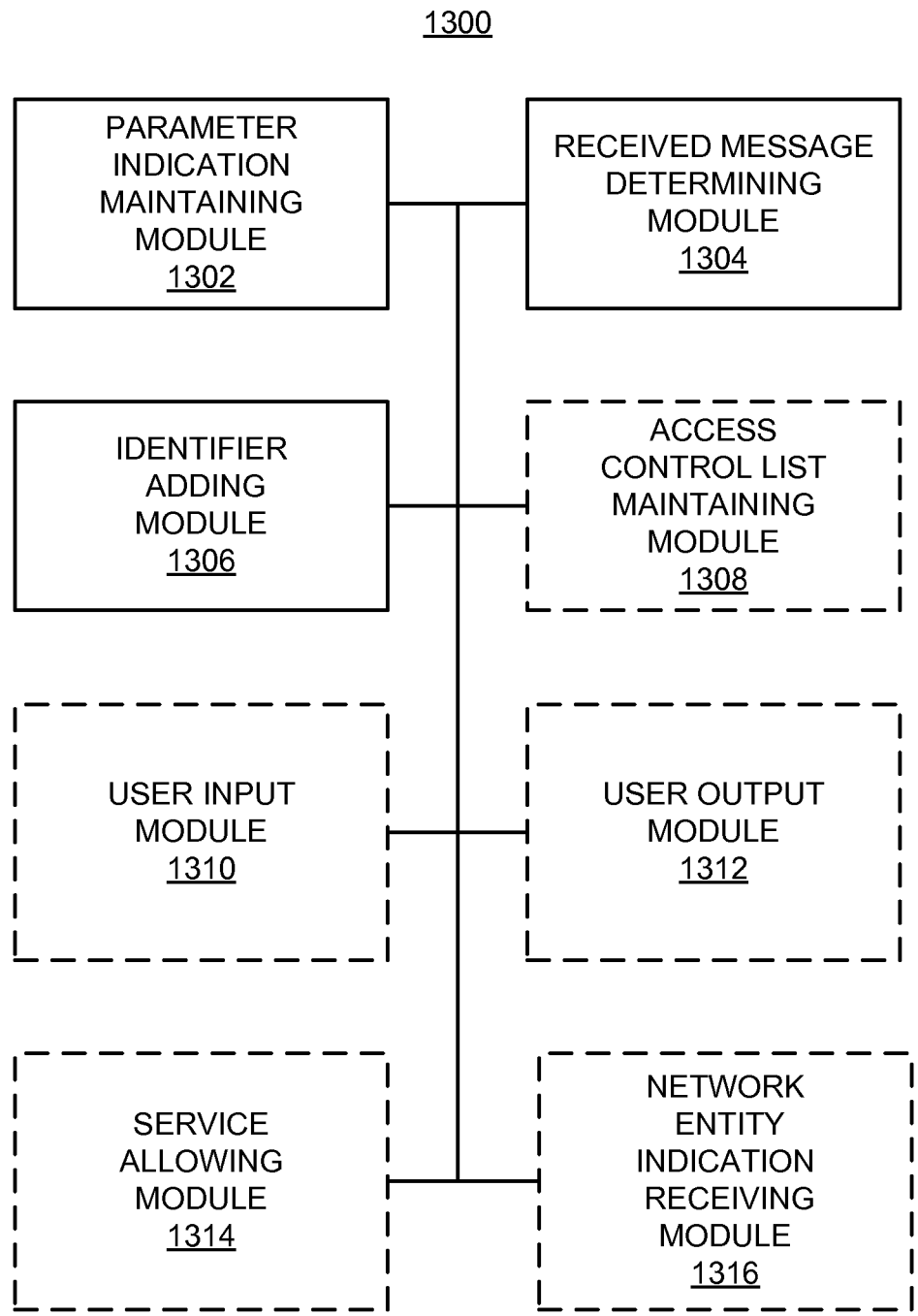
Figure 14:
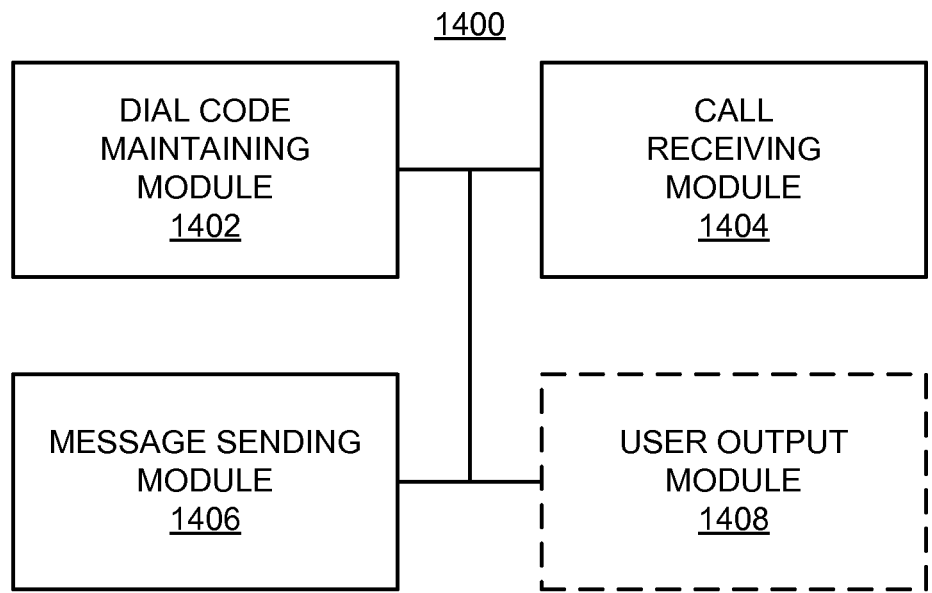
Figure 15:
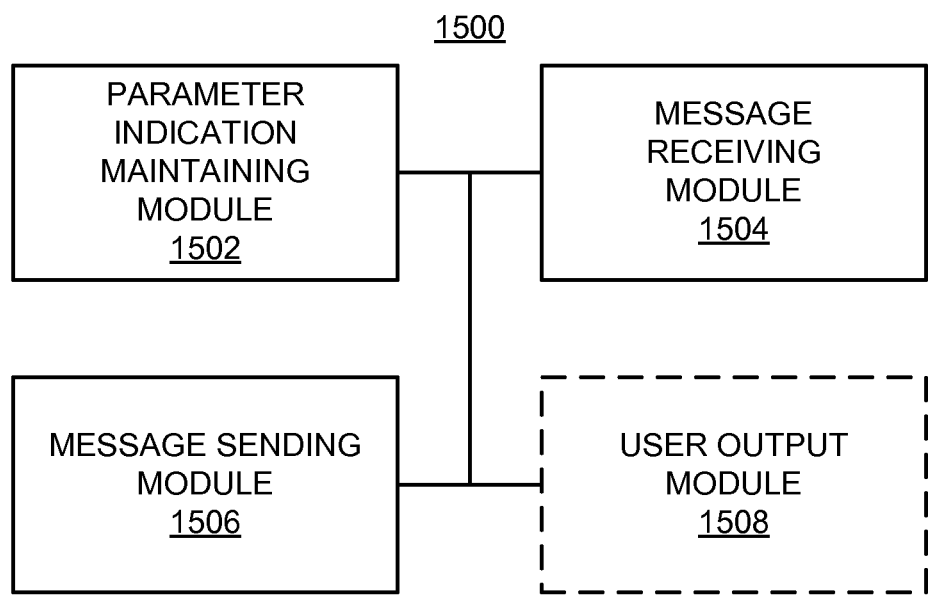
Figure 16:
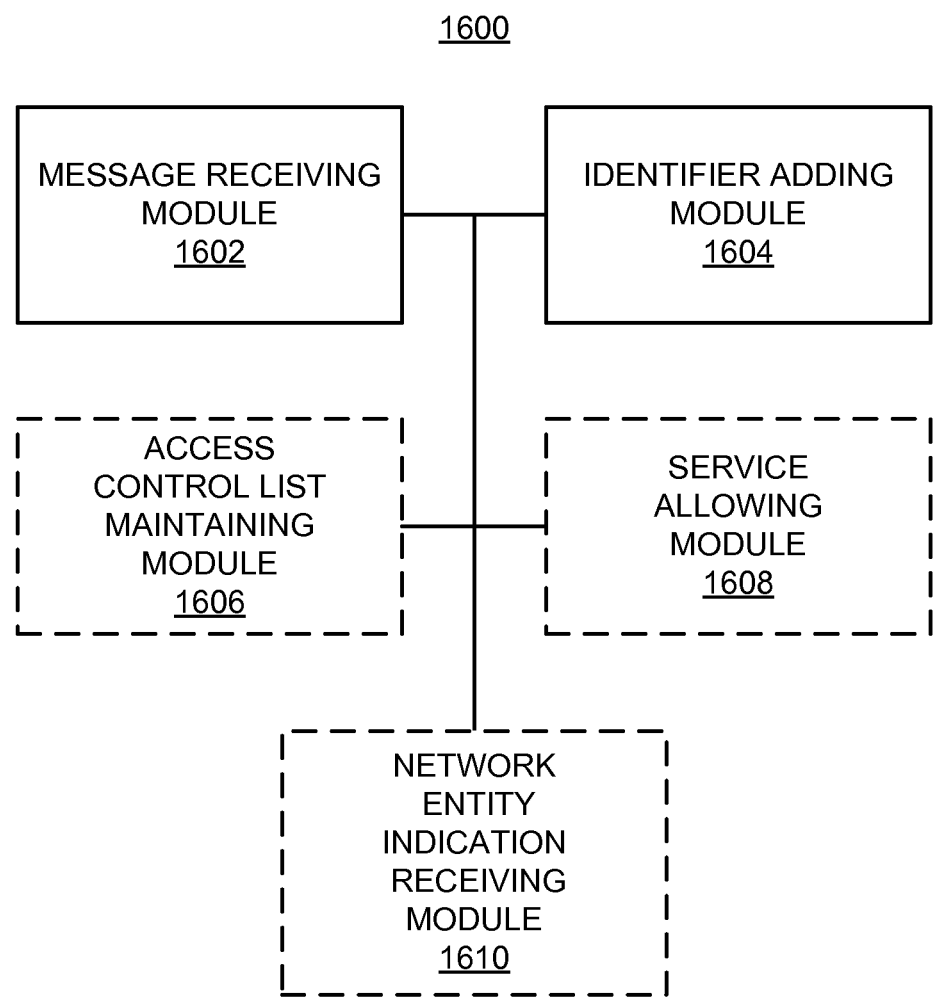

FIG. 10 illustrates a wireless device 1010 (e.g., an access point) and a wireless device 1050 (e.g., an access terminal) of a sample MIMO system 1000. At the device 1010, traffic data for a number of data streams is provided from a data source 1012 to a transmit (TX) data processor 1014. Each data stream may then be transmitted over a respective transmit antenna.

The TX data processor 1014 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1030. A data memory 1032 may store program code, data, and other information used by the processor 1030 or other components of the device 1010.

The modulation symbols for all data streams are then provided to a TX MIMO processor 1020, which may further process the modulation symbols (e.g., for OFDM). The TX MIMO processor 1020 then provides $N_T$ modulation symbol streams to $N_T$ transceivers (XCVR) 1022A through 1022T. In some aspects, the TX MIMO processor 1020 applies beam-forming weights to the symbols of the data streams and to the antenna from which the symbol is being transmitted.

Each transceiver 1022 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1022A through 1022T are then transmitted from $N_T$ antennas 1024A through 1024T, respectively.

At the device 1050, the transmitted modulated signals are received by $N_R$ antennas 1052A through 1052R and the received signal from each antenna 1052 is provided to a respective transceiver (XCVR) 1054A through 1054R. Each transceiver 1054 conditions (e.g., filters, amplifies, and downconverts) a respective received signal, digitizes the conditioned signal to provide samples, and further processes the samples to provide a corresponding "received" symbol stream.

A receive (RX) data processor 1060 then receives and processes the $N_R$ received symbol streams from $N_R$ transceivers 1054 based on a particular receiver processing technique to provide $N_T$ "detected" symbol streams. The RX data processor 1060 then demodulates, deinterleaves, and decodes each detected symbol stream to recover the traffic data for the data stream. The processing by the RX data processor 1060 is complementary to that performed by the TX MIMO processor 1020 and the TX data processor 1014 at the device 1010.

A processor 1070 periodically determines which pre-coding matrix to use (discussed below). The processor 1070 formulates a reverse link message comprising a matrix index portion and a rank value portion. A data memory 1072 may store program code, data, and other information used by the processor 1070 or other components of the device 1050.

The reverse link message may comprise various types of information regarding the communication link and/or the received data stream. The reverse link message is then processed by a TX data processor 1038, which also receives traffic data for a number of data streams from a data source 1036, modulated by a modulator 1080, conditioned by the transceivers 1054A through 1054R, and transmitted back to the device 1010.

At the device 1010, the modulated signals from the device 1050 are received by the antennas 1024, conditioned by the transceivers 1022, demodulated by a demodulator (DEMOD) 1040, and processed by a RX data processor 1042 to extract the reverse link message transmitted by the device 1050. The processor 1030 then determines which pre-coding matrix to use for determining the beam-forming weights then processes the extracted message.

FIG. 10 also illustrates that the communication components may include one or more components that perform access control operations as taught herein. For example, an access control component 1090 may cooperate with the processor 1030 and/or other components of the device 1010 to control whether another device (e.g., device 1050) may access the device 1010 as taught herein. Similarly, an access control component 1092 may cooperate with the processor 1070 and/or other components of the device 1050 to access another device (e.g., device 1010). It should be appreciated that for each device 1010 and 1050 the functionality of two or more of the described components may be provided by a single component. For example, a single processing component may provide the functionality of the access control component 1090 and the processor 1030 and a single processing component may provide the functionality of the access control component 1092 and the processor 1070.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Rel99, Rel5, Rel6, Rel7) technology, as well as 3GPP2 (e.g., 1xRTT, 1xEV-DO Rel0, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The functionality described herein (e.g., with regard to one or more of the accompanying figures) may correspond in some aspects to similarly designated "means for" functionality in the appended claims. Referring to FIGS. 11-16, apparatuses 1100, 1200, 1300, 1400, 1500, and 1600 are represented as a series of interrelated functional modules. Here, an access control disabling module 1102 may correspond at least in some aspects to, for example, an access controller as discussed herein. A message receiving module 1104 may correspond at least in some aspects to, for example, a receiver as discussed herein. A service allowing module 1106 may correspond at least in some aspects to, for example, an access controller as discussed herein. An access control list maintaining module 1108 may correspond at least in some aspects to, for example, an access controller and/or memory component as discussed herein. A user input module 1110 may correspond at least in some aspects to, for example, a user input device as discussed herein. An indication receiving module 1112 may correspond at least in some aspects to, for example, a receiver as discussed herein. A network interface module 1114 may correspond at least in some aspects to, for example, a network interface as discussed herein. A confirmation message sending module 1116 may correspond at least in some aspects to, for example, a transmitter as discussed herein. A dial code maintaining module 1202 may correspond at least in some aspects to, for example, an access controller and/or memory component as discussed herein. A received call determining module 1204 may correspond at least in some aspects to, for example, a receiver as discussed herein. A service allowing module 1206 may correspond at least in some aspects to, for example, an access controller as discussed herein. An access control list maintaining module 1208 may correspond at least in some aspects to, for example, an access controller as discussed herein. A user input module 1210 may correspond at least in some aspects to, for example, a user input device as discussed herein. A user output module 1212 may correspond at least in some aspects to, for example, a user output device as discussed herein. A network entity indication receiving module 1214 may correspond at least in some aspects to, for example, a network interface as discussed herein. A parameter indication maintaining module 1302 may correspond at least in some aspects to, for example, an access controller and/or memory component as discussed herein. A received message determining module 1304 may correspond at least in some aspects to, for example, a receiver as discussed herein. An identifier adding module 1306 may correspond at least in some aspects to, for example, an access controller as discussed herein. An access control list maintaining module 1308 may correspond at least in some aspects to, for example, an access controller as discussed herein. A user input module 1310 may correspond at least in some aspects to, for example, a user input device as discussed herein. A user output module 1312 may correspond at least in some aspects to, for example, a user output device as discussed herein. A service allowing module 1314 may correspond at least in some aspects to, for example, an access controller as discussed herein. A network entity indication receiving module 1316 may correspond at least in some aspects to, for example, a network interface as discussed herein. A dial code maintaining module 1402 may correspond at least in some aspects to, for example, an access controller and/or memory component as discussed herein. A call receiving module 1404 may correspond at least in some aspects to, for example, a receiver as discussed herein. A message sending module 1406 may correspond at least in some aspects to, for example, an access controller as discussed herein. A user output module 1408 may correspond at least in some aspects to, for example, a user output device as discussed herein. A parameter indication maintaining module 1502 may correspond at least in some aspects to, for example, an access controller and/or memory component as discussed herein. A message receiving module 1504 may correspond at least in some aspects to, for example, a receiver as discussed herein. A message sending module 1506 may correspond at least in some aspects to, for example, an access controller as discussed herein. A user output module 1508 may correspond at least in some aspects to, for example, a user output device as discussed herein. A message receiving module 1602 may correspond at least in some aspects to, for example, a receiver as discussed herein. An identifier adding module 1604 may correspond at least in some aspects to, for example, an access controller as discussed herein. An access control list maintaining module 1606 may correspond at least in some aspects to, for example, an access controller as discussed herein. A service allowing module 1608 may correspond at least in some aspects to, for example, an access controller as discussed herein. A network entity indication receiving module 1610 may correspond at least in some aspects to, for example, a network interface as discussed herein.

The functionality of the modules of FIGS. 11-16 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIGS. 11-16 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
    maintaining a defined dial code comprising a combination of dialing numbers and dialing symbols at an enforcement point for an access point, wherein the defined dial code is kept secret and only shared with selected access terminals;
    determining that the access point received a call that is based on the defined dial code and is received from one of the selected access terminals that is not currently allowed to obtain a service through the access point, wherein the one of the selected access terminals provides the defined dial code to the access point via a selected access terminal dial pad during the call; and
    allowing the selected access terminal to obtain the service through the access point as a result of the reception of the defined dial code during the call and adding an identifier of the selected access terminal to an access control list for the access point.

2. The method of claim 1, further comprising maintaining the access control list at the enforcement point for the access point.

3. The method of claim 2, wherein the enforcement point is implemented at the access point or an access point gateway for the access point.

4. The method of claim 1, wherein:
    the method is performed at the access point; and
    the determination comprises receiving the call.

5. The method of claim 1, wherein:
    the method is performed at an access point gateway for the access point; and
    the determination comprises receiving a message from the access point that indicates that the access point received the call that is based on the defined dial code.

6. The method of claim 1, wherein the maintaining of the defined dial code comprises receiving the defined dial code via a user input device.

7. The method of claim 1, wherein:
    the maintaining of the defined dial code comprises randomly generating the defined dial code; and
    the method further comprises outputting the randomly generated dial code via a user output device.

8. The method of claim 1, further comprising:
    maintaining at least one other defined dial code at the enforcement point for the access point;
    determining that the access point received at least one other call from at least one other selected access terminal, wherein the at least one other call is based on the at least one other defined dial code; and
    allowing the at least one other selected access terminal to obtain the service through the access point as a result of the reception of the at least one other call.

9. The method of claim 1, wherein allowing the selected access terminal to obtain the service comprises allowing the selected access terminal to obtain the service for a defined period of time.

10. The method of claim 9, further comprising receiving an indication of the defined period of time from a network entity.

11. The method of claim 1, further comprising receiving an indication of a maximum number of temporary users from a network entity, wherein the selected access terminal is allowed to obtain the service through the access point if a current quantity of temporary users for the access point does not exceed the maximum number of temporary users.

12. The method of claim 1, wherein the access point comprises a femto cell.

13. The method of claim 1, further comprising:
    determining that the access point received at least one other call that is based on the defined dial code and is received from at least one other selected access terminal that is not currently allowed to obtain the service through the access point, wherein the at least one other selected access terminal provides the defined dial code to the access point, wherein the defined dial code is received by the at least one other selected access terminal via at least one other selected access terminal dial pad during the call; and
    allowing the at least one other selected access terminal to obtain the service through the access point as a result of the reception of the defined dial code during the at least one other call.

14. An apparatus for communication, comprising:
    a memory component configured to maintain a defined dial code comprising a combination of dialing numbers and dialing symbols at an enforcement point for an access point, wherein the defined dial code is kept secret and only shared with selected access terminals; and
    an access controller configured to determine that the access point received a call that is based on the defined dial code and is received from one of the selected access terminals that is not currently allowed to obtain a service through the access point, wherein the one of the selected access terminals provides the defined dial code to the access point via a selected access terminal dial pad during the call;
    wherein the access controller is further configured to allow the selected access terminal to obtain the service through the access point as a result of the reception of the defined dial code during the call and adding an identifier of the selected access terminal to an access control list for the access point.

15. The apparatus of claim 14, wherein the access controller is further configured to maintain the access control list at the enforcement point for the access point.

16. The apparatus of claim 15, wherein the enforcement point is implemented at the access point or an access point gateway for the access point.

17. The apparatus of claim 14, wherein:
    the apparatus is the access point; and the determination comprises receiving the call.

18. The apparatus of claim 14, wherein:
    the apparatus is an access point gateway for the access point; and the determination comprises receiving a message from the access point that indicates that the access point received the call that is based on the defined dial code.

19. The apparatus of claim 14, further comprising a user input device, wherein the maintaining of the defined dial code comprises receiving the defined dial code via the user input device.

20. The apparatus of claim 14, wherein:
the maintaining of the defined dial code comprises randomly generating the defined dial code; and
the apparatus further comprises a user output device configured to output the randomly generated dial code.

21. The apparatus of claim 14, wherein:
the access controller is further configured to maintain at least one other defined dial code at the enforcement point for the access point;
the access controller is further configured to determine that the access point received at least one other call from at least one other selected access terminal;
the at least one other call is based on the at least one other defined dial code; and
the access controller is further configured to allow the at least one other selected access terminal to obtain the service through the access point as a result of the reception of the at least one other call.

22. The apparatus of claim 14, wherein allowing the selected access terminal to obtain the service comprises allowing the access terminal to obtain the service for a defined period of time.

23. The apparatus of claim 22, further comprising a network interface configured to receive an indication of the defined period of time from a network entity.

24. The apparatus of claim 14, further comprising a network interface configured to receive an indication of a maximum number of temporary users from a network entity, wherein the selected access terminal is allowed to obtain the service through the access point if a current quantity of temporary users for the access point does not exceed the maximum number of temporary users.

25. The apparatus of claim 14, wherein the access point comprises a femto cell.

26. An apparatus for communication, comprising:
means for maintaining a defined dial code comprising a combination of dialing numbers and dialing symbols at an enforcement point for an access point, wherein the defined dial code is kept secret and only shared with selected access terminals;
means for determining that the access point received a call that is based on the defined dial code and is received from one of the selected access terminals that is not currently allowed to obtain a service through the access point, wherein the one of the selected access terminals provides the defined dial code to the access point via a selected access terminal dial pad during the call; and
means for allowing the selected access terminal to obtain the service through the access point as a result of the reception of the defined dial code during the call and adding an identifier of the selected access terminal to an access control list for the access point.

27. The apparatus of claim 26, further comprising means for maintaining the access control list at the access point.

28. The apparatus of claim 26, further comprising user input means, wherein the maintaining of the defined dial code comprises receiving the defined dial code via the user input means.

29. The apparatus of claim 26, wherein allowing the selected access terminal to obtain the service comprises allowing the selected access terminal to obtain the service for a defined period of time.

30. A non-transitory computer-program product, comprising:
computer-readable medium comprising code for causing a computer to:
maintain a defined dial code comprising a combination of dialing numbers and dialing symbols at an enforcement point for an access point, wherein the defined dial code is kept secret and only shared with selected access terminals;
determine that the access point received a call that is based on the defined dial code and is received from one of the selected access terminals that is not currently allowed to obtain a service through the access point, wherein the one of the selected access terminals provides the defined dial code to the access point via a selected access terminal dial pad during the call; and
allow the selected access terminal to obtain the service through the access point as a result of the reception of the defined dial code during the call and adding an identifier of the access terminal to an access control list for the access point.

31. The non-transitory computer-program product of claim 30, wherein the computer-readable medium further comprises code for causing the computer to maintain the access control list at the access point.

32. The non-transitory computer-program product of claim 30, wherein the maintaining of the defined dial code comprises receiving the defined dial code via a user input device.

33. The non-transitory computer-program product of claim 30, wherein allowing the selected access terminal to obtain the service comprises allowing the selected access terminal to obtain the service for a defined period of time.

* * * * *